US008506095B2

(12) United States Patent  (10) Patent No.: US 8,506,095 B2
Bacon, Jr. et al.  (45) Date of Patent: Aug. 13, 2013

(54) PROTECTIVE OVERLAY BEARING A GRAPHIC AND RETROREFLECTIVE ARTICLES COMPRISING THE OVERLAY

(75) Inventors: Chester A. Bacon, Jr., Oakdale, MN (US); Bradley R. Ray, Woodbury, MN (US); Stewart H. Corn, St. Paul, MN (US); Timothy S. Skogland, Scandia, MN (US); Thomas G. Cheesebrow, Hugo, MN (US); Michael J. Petrich, Lake Elmo, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 135 days.

(21) Appl. No.: 13/130,844

(22) PCT Filed: Nov. 20, 2009

(86) PCT No.: PCT/US2009/065231
§ 371 (c)(1),
(2), (4) Date: May 24, 2011

(87) PCT Pub. No.: WO2010/077475
PCT Pub. Date: Jul. 8, 2010

(65) Prior Publication Data
US 2011/0228391 A1  Sep. 22, 2011

Related U.S. Application Data

(60) Provisional application No. 61/120,696, filed on Dec. 8, 2008.

(51) Int. Cl.
*G02B 5/122* (2006.01)
(52) U.S. Cl.
USPC .......................................... 359/529

(58) Field of Classification Search
USPC .................................. 359/529, 530
See application file for complete search history.

(56) References Cited

U.S. PATENT DOCUMENTS

| 3,684,348 A | 8/1972 | Rowland |
| 4,025,159 A | 5/1977 | McGrath |

(Continued)

FOREIGN PATENT DOCUMENTS

| CN | 1292880 | 4/2001 |
| CN | 1350935 | 5/2002 |

(Continued)

OTHER PUBLICATIONS

"American National Standard for High-Visibility Safety Apparel and Headwear," ANSI/ISEA, 107-2004, 42 pages, 2004.

(Continued)

*Primary Examiner* — Euncha Cherry
(74) *Attorney, Agent, or Firm* — Nicole J. Einerson

(57) ABSTRACT

A transfer article, a retroreflective article and methods of making the same. The transfer article can include an overlay. The retroreflective article can include an optical layer and an overlay. The optical layer can include a front surface and a rear surface, and can include retroreflective optical elements. The overlay can include a front surface and a rear surface adapted to be coupled to the front surface of a substrate, such as the optical layer. The overlay can further include a graphic, such that the graphic is buried with respect to the front surface of the overlay. A method of making the retroreflective article can include applying a graphic to the rear surface of the overlay, and coupling the overlay bearing the graphic to the front surface of a substrate, such as the optical layer.

20 Claims, 4 Drawing Sheets

(56) References Cited

U.S. PATENT DOCUMENTS

| | | |
|---|---|---|
| 4,153,412 A | 5/1979 | Bailey |
| 4,588,258 A | 5/1986 | Hoopman |
| 4,767,659 A | 8/1988 | Bailey |
| 4,775,219 A | 10/1988 | Appeldorn |
| 4,983,436 A | 1/1991 | Bailey |
| 5,064,272 A | 11/1991 | Bailey |
| 5,066,098 A | 11/1991 | Kult |
| 5,069,964 A | 12/1991 | Tolliver |
| 5,080,463 A | 1/1992 | Faykish |
| 5,085,918 A | 2/1992 | Rajan |
| 5,138,488 A | 8/1992 | Szczech |
| 5,169,707 A | 12/1992 | Faykish |
| 5,213,872 A | 5/1993 | Pricone |
| 5,229,882 A | 7/1993 | Rowland |
| 5,262,225 A | 11/1993 | Wilson |
| 5,344,705 A | 9/1994 | Olsen |
| 5,378,575 A | 1/1995 | Rajan |
| 5,387,458 A | 2/1995 | Pavelka |
| 5,393,590 A | 2/1995 | Caspari |
| 5,450,235 A | 9/1995 | Smith |
| 5,605,761 A | 2/1997 | Burns |
| 5,614,286 A | 3/1997 | Bacon, Jr. |
| 5,656,360 A | 8/1997 | Faykish |
| 5,672,381 A | 9/1997 | Rajan |
| 5,691,846 A | 11/1997 | Benson, Jr. |
| 5,698,364 A | 12/1997 | Janssens |
| 5,706,133 A | 1/1998 | Orensteen |
| 5,770,124 A | 6/1998 | Marecki |
| 5,910,812 A | 6/1999 | Yamamoto |
| 5,916,399 A | 6/1999 | Olsen |
| 5,977,263 A | 11/1999 | Phillips |
| 5,988,820 A | 11/1999 | Huang |
| 6,024,455 A * | 2/2000 | O'Neill et al. ............... 359/530 |
| 6,054,208 A | 4/2000 | Rega |
| 6,100,217 A | 8/2000 | Nagaoka |
| 6,119,751 A | 9/2000 | Nilsen |
| 6,120,636 A | 9/2000 | Nilsen |
| 6,157,486 A | 12/2000 | Benson, Jr. |
| 6,172,810 B1 | 1/2001 | Fleming |
| 6,174,607 B1 | 1/2001 | Sugita |
| 6,200,666 B1 | 3/2001 | Christian |
| 6,224,219 B1 | 5/2001 | Fleming |
| 6,243,201 B1 | 6/2001 | Fleming |
| 6,350,035 B1 | 2/2002 | Smith |
| 6,506,480 B2 | 1/2003 | Liu |
| 6,514,655 B2 | 2/2003 | Bastiaens |
| 6,534,128 B1 | 3/2003 | Carlson |
| 6,534,158 B2 | 3/2003 | Huang |
| 6,568,817 B1 | 5/2003 | Mimura |
| 6,660,390 B2 | 12/2003 | Bacon, Jr. |
| 6,677,028 B1 | 1/2004 | Lasch |
| 6,677,045 B1 | 1/2004 | Meisenburg |
| 6,720,042 B2 | 4/2004 | Ylitalo |
| 6,723,433 B2 | 4/2004 | Bacon, Jr. |
| 6,726,982 B2 | 4/2004 | Christian |
| 6,790,578 B1 | 9/2004 | Rajan |
| 6,953,624 B2 | 10/2005 | Bacon, Jr. |
| 7,185,993 B2 | 3/2007 | Smith |
| 7,195,360 B2 | 3/2007 | Bacon, Jr. |
| 7,547,105 B2 | 6/2009 | Bacon, Jr. |
| 7,648,744 B2 | 1/2010 | Kuo |
| 2003/0211299 A1 | 11/2003 | Rajan |
| 2004/0006152 A1 | 1/2004 | Weikard |
| 2004/0029044 A1 | 2/2004 | Severance |
| 2007/0014011 A1 | 1/2007 | Smith |

FOREIGN PATENT DOCUMENTS

| | | |
|---|---|---|
| CN | 1993235 | 7/2007 |
| EP | 0615788 | 9/1994 |
| EP | 1062531 | 5/2003 |
| JP | 2004-036161 | 2/2004 |
| JP | 2004-037831 | 2/2004 |
| JP | 2004-045487 | 2/2004 |
| JP | 2004-136541 | 5/2004 |
| KR | 10-1999-0060133 | 7/1999 |
| WO | 99/46616 | 9/1999 |
| WO | WO 2007/124217 | 11/2007 |
| WO | 2010/077474 | 7/2010 |

OTHER PUBLICATIONS

European Standard EN471, High-visibility warning clothing for professional use—Test methods and requirements, 30 pages, 2003.

"ASTM E810-03 Standard Test Method for Coefficient of Retroreflection of Retroreflective Sheeting Utilizing the Coplanar Geometry", ASTM International, West Conshohocken, PA., Approved Feb. 10, 2003, Published Apr. 2003, 8 pages.

"CIE 54.2 Retroreflection: Definition and Measurement", International Commission on Illumination, Published 2001, 62 pages.

International Standard ISO/FDIS 6330 "Textiles-Domestic Washing and Drying Procedures for Textile Testing" (2000), 18 pages.

International Search Report PCT/US2009/065231 Jun. 30, 2010 4 pgs.

3M Material Safety Data Sheet 3M™ Thermal Transfer Ribbon TTR1300 Series Sep. 20, 2007, 7 pages.

* cited by examiner

PROTECTIVE OVERLAY BEARING A GRAPHIC AND RETROREFLECTIVE ARTICLES COMPRISING THE OVERLAY

CROSS REFERENCE TO RELATED APPLICATIONS

This is a national stage filing under 35 U.S.C. 371 of PCT/US2009/065231, filed Nov. 20, 2009, which claims priority to U.S. Provisional Application No. 61/120,696 filed Dec. 8, 2008, the disclosure of which is incorporated by reference in its entirety herein.

FIELD

The present disclosure generally relates to protective overlays bearing a graphic that can be coupled to a substrate to provide the substrate with a desired color and/or image, and particularly, to retroreflective articles comprising an overlay bearing a graphic.

BACKGROUND

Graphics can be used to deliver a desired visual effect, and can be used to customize various substrates. Typically, such customization occurs by modifying an outwardly-facing surface of the substrate, so that a color and/or image is visible. Such customization can help identify the source of a good or service, and/or can include a text graphic with informational or advisory language. Customization of some substrates, however, can be difficult, costly, time-consuming and wasteful.

Retroreflective articles can be used to provide conspicuity to a variety of rigid and flexible materials. Some retroreflective articles can provide daytime and nighttime visibility to the materials to which they are applied for enhanced conspicuity under any lighting condition. Some retroreflective articles can include a color and/or graphic that is visible at least under daytime lighting conditions.

SUMMARY

One aspect of the present disclosure provides a retroreflective article that can include an optical layer comprising retroreflective optical elements. The optical layer can have a front surface and a rear surface. The retroreflective article can further include an overlay having a front surface and a rear surface. The rear surface of the overlay can be coupled to the front surface of the optical layer, and the rear surface of the overlay can be at least partially formed of a bonding material that has a bonding temperature greater than room temperature and a graphic material that has a bonding temperature greater than room temperature.

Another aspect of the present disclosure provides a retroreflective article that can include an optical layer comprising retroreflective optical elements. The optical layer can have a front surface and a rear surface. The retroreflective article can further include an overlay having a front surface and a rear surface. The rear surface of the overlay can be coupled to the front surface of the optical layer, and the rear surface of the overlay can be at least partially formed of a bonding material that has a bonding temperature greater than room temperature. The bonding material can be infused with a graphic, such that the graphic is visible from the front surface of the overlay.

Another aspect of the present disclosure provides a retroreflective article that can include an optical layer comprising retroreflective optical elements, the optical layer having a front surface and a rear surface. The retroreflective article can further include an overlay having a front surface and a rear surface. The rear surface of the overlay can be adapted to be coupled to the front surface of the optical layer, and the overlay can include a graphic, such that the graphic is buried with respect to the front surface of the overlay.

Another aspect of the present disclosure provides a retroreflective article that can include an optical layer comprising retroreflective optical elements, the optical layer having a front surface and a rear surface. The retroreflective article can further include an overlay having a front surface and a rear surface. The rear surface of the overlay can be adapted to be coupled to the front surface of the optical layer. The overlay can include a front portion that includes the front surface and a rear portion that includes the rear surface. The rear portion of the overlay can include a graphic, such that the graphic is buried with respect to the front surface of the overlay.

Another aspect of the present disclosure provides a method of making a retroreflective article. The method can include providing an optical layer comprising retroreflective optical elements. The optical layer can include a front surface and a rear surface. The method can further include providing an overlay having a front surface and a rear surface. The rear surface of the overlay can be at least partially formed of a bonding material that has a bonding temperature greater than room temperature. The method can further include applying a graphic to the rear surface of the overlay, such that the graphic is buried with respect to the front surface of the overlay. The method can further include coupling the overlay bearing the graphic to the front surface of the optical layer.

Another aspect of the present disclosure provides a transfer article that can include an overlay having a front surface and a rear surface. The rear surface of the overlay can be at least partially formed of a bonding material that has a bonding temperature greater than room temperature and a graphic material that has a bonding temperature greater than room temperature. The rear surface of the overlay can be adapted to be coupled to a substrate.

Another aspect of the present disclosure provides a transfer article that can include an overlay having a front surface and a rear surface. The rear surface of the overlay can be adapted to be coupled to a substrate. The overlay can be at least partially formed of a bonding material that has a bonding temperature greater than room temperature. The bonding material can be infused with a graphic, such that the graphic is visible from the front surface of the overlay.

Another aspect of the present disclosure provides a method of making a transfer article. The method can include providing an overlay having a front surface and a rear surface. The rear surface of the overlay can be at least partially formed of a bonding material that has a bonding temperature greater than room temperature. The method can further include applying a graphic material to the rear surface of the overlay to form a graphic that is buried with respect to the front surface of the overlay. The graphic material can have a bonding temperature greater than room temperature.

Another aspect of the present disclosure provides a method of making a transfer article. The method can include providing an overlay having a front surface and a rear surface. The rear surface of the overlay can be at least partially formed of a bonding material that has a bonding temperature greater than room temperature. The method can further include infusing the bonding material with a graphic, such that the graphic is buried with respect to the front surface of the overlay.

Other features and aspects of the present disclosure will become apparent by consideration of the detailed description and accompanying drawings.

DETAILED DESCRIPTION

Figure 1:
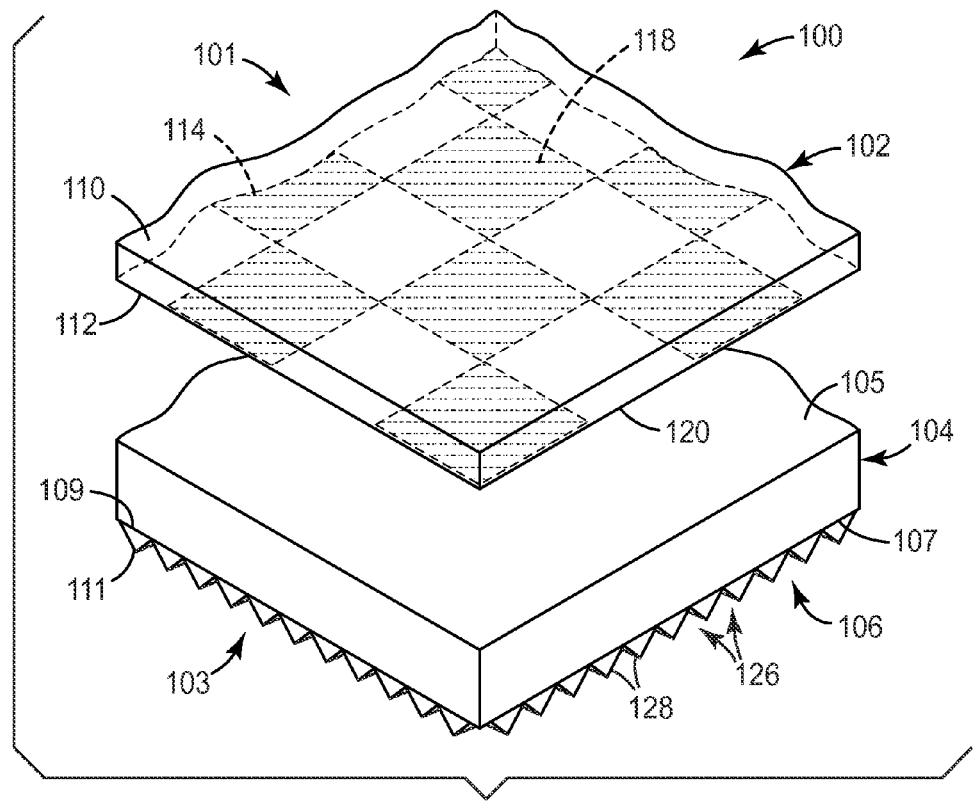
FIG. 1 is a schematic exploded perspective view of a retroreflective article comprising an overlay according to one embodiment of the present disclosure.

Before any embodiments of the present disclosure are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "connected" and "coupled," and variations thereof, are used broadly and encompass both direct and indirect connections and couplings. Further, "connected" and "coupled" are not restricted to physical or mechanical connections or couplings. It is to be understood that other embodiments may be utilized, and structural or logical changes may be made without departing from the scope of the present disclosure. Furthermore, terms such as "front," "rear," and the like are only used to describe elements as they relate to one another, but are in no way meant to recite specific orientations of the apparatus, to indicate or imply necessary or required orientations of the apparatus, or to specify how the invention described herein will be used, mounted, displayed, or positioned in use.

The present disclosure generally relates to overlays bearing a graphic that can be coupled to a substrate to provide the substrate with a desired color and/or image. The present disclosure further relates to retroreflective articles comprising the overlay, such that the retroreflective article has a desired color and/or image.

Many substrates for a variety of uses and applications can be customized to a user's specifications to bear a desired color, image, trademark, logo, or the like. However, in some applications, the substrate itself can be a bulky or expensive material, and customization can be difficult, expensive, and/or wasteful. By allowing the customization to occur on an overlay material, the end product can still bear the desired color and/or image, without affecting the underlying substrate. Conventional surface printing by various methods on graphic display films or retroreflective articles permanently links a single use color or design image to the substrate. Misprints, over runs, design changes, inventory, and supply change issues are just some of the cost compounding problems that such a fixed substrate can generate. In addition, such a color/image can still be exposed to abrasion and other environmental degradation. To enhance the performance and durability of such a substrate, additional cost compounding protective overlay films or coatings may be required to protect the colored/imaged surface of the substrate.

For example, in the field of retroreflective articles, the substrate can include a retroreflective article having optical elements (e.g., microspheres, cube-corner optical elements, etc.) and can be relatively expensive, compared to an overlay material that may be positioned on the front surface of the retroreflective article in order to provide one or more of stain resistance, low coefficient of friction, chemical resistance, weather resistance, toughness, and abrasion resistance to the retroreflective article. Customizing the overlay material in such embodiments can allow a user to use a standard, uncustomized retroreflective article with the user's own customized overlay to produce the desired customized retroreflective article. In addition, by customizing the overlay material, a supplier of the underlying substrate material can supply the same substrate to a wide variety of customers, giving the customers the flexibility to modify the substrate as desired without requiring the supplier to provide a wide variety of individualized substrates.

In addition, in some cases, the underlying substrate can include a surface topography that makes it difficult to obtain quality, reproducible colors and/or images by standard printing or coating methods. By customizing the overlay instead of the underlying substrate, users can avoid the color/image design limitations, cost, difficulty, waste and/or potentially low quality product associated with printing on a relatively rough substrate, or a substrate with surface topography. That is, customizing the overlay allows for customization of a greater variety of substrates, such that the surface topography of the substrate is not a substantial limitation of the customization options.

A "retroreflective" article reflects incident incoming light in a direction generally parallel to the incident direction, or nearly so, such that an observer or detector at or near the light source can see or detect the reflected light. The word "light" refers generally to visible radiation in the electromagnetic spectrum. Retroreflective articles can include microsphere-based retroreflective articles, prismatic or cube-corner-based retroreflective articles, or a combination thereof.

The term "prismatic" or "cube-corner-based," when used with respect to retroreflective articles, generally refers to an array of cube-corner optical elements. "Cube-corner optical elements" include generally trihedral structures that have three approximately mutually perpendicular lateral faces meeting in a single corner (i.e., a cube-corner) to retroreflect incoming light. A "prismatic retroreflective article" generally includes a structured rear surface (i.e., a surface opposite the surface through which incoming light is directed) that includes a plurality of geometric structures, some or all of which include three reflective faces configured as a cube-corner optical element. Illustrative examples of cube-corner-based retroreflective articles are disclosed in U.S. Pat. Nos. 5,138,488 (Szczech); 5,387,458 (Pavelka); 5,450,235 (Smith); 5,605,761 (Burns); 5,614,286 (Bacon) and 5,691,846 (Benson, Jr.), each of which is incorporated herein by reference.

The term "microsphere-based," when used with respect to retroreflective articles, generally refers to a layer having a plurality of microspheres or "beads," which can be at least partially embedded in a binder layer. Such microspheres can be associated with specular or diffuse reflecting materials (e.g., pigment particles, metal flakes or vapor coats, etc.) to retroreflect incident light. Due to the symmetrical geometry of beaded retroreflectors, microsphere-based retroreflective sheeting can exhibit the same total light return regardless of orientation, i.e., when rotated about an axis normal to the surface of the sheeting. Thus, such microsphere-based sheeting has a relatively low sensitivity to the orientation at which the sheeting is placed on a surface. However, in some embodiments, such retroreflective articles can have a lower retroreflective efficiency than prismatic retroreflective articles. Illustrative examples of microsphere-based retroreflective articles are disclosed in U.S. Pat. Nos. 4,025,159 (McGrath); 4,767,659 (Bailey); 4,983,436 (Bailey); 5,064,272 (Bailey); 5,066,098 (Kult); 5,069,964 (Tolliver); 5,262,225 (Wilson); and 6,677,028 (Lasch), each of which is incorporated herein by reference.

The word "polymer" includes homopolymers and copolymers. The term "copolymer" includes both random and block polymers.

The term "coating" is used to refer broadly to a variety of coating methods, including, but not limited to, notch bar coating, wire bar coating, spray coating, brushing, controlled orifice die coating, and combinations thereof.

The term "transparent" is used according to its ordinary meaning. In some embodiments, it is used to refer to a material or layer that is able to transmit at least about 50 percent of the intensity of the light incident upon it at a given wavelength, measured along a normal axis. In some embodiments, the materials or layers (e.g., polymers) that are used in the retroreflective sheeting of the present disclosure have a light transmissibility of greater than about 70 percent, in some embodiments, greater than about 80 percent, and in some embodiments, greater than about 90 percent.

The phrase "internally reflecting," when used with respect to a cube-corner optical element, is used broadly herein to refer to an element that reflects incident light back through the element either due to an air interface on the cube-corner element rear surface, or due to a reflective coating (e.g., a metalized coating, a coating containing a reflective pigment or a stack of coating layers having a refractive index mismatch) on the cube-corner element rear surface.

Figure 2:
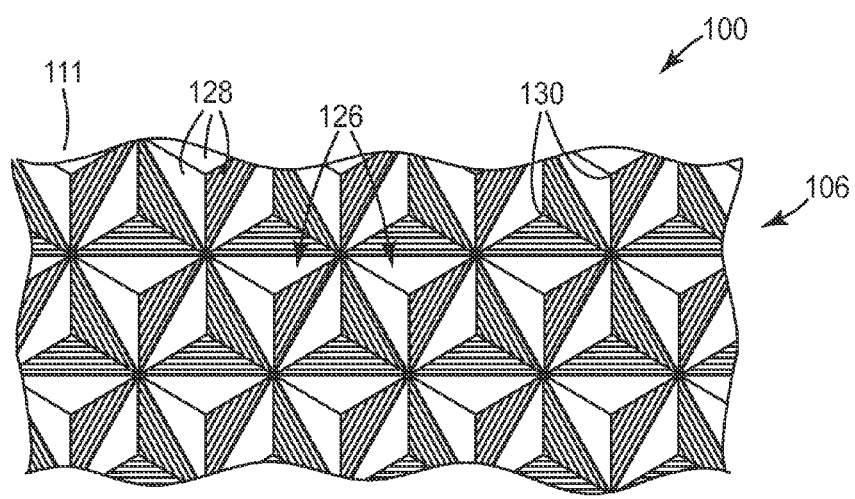
FIG. 2 is a plan view of the rear surface of the retroreflective article of FIG. 1.

FIGS. 1-2 illustrate a retroreflective article 100 (also sometimes referred to as "retroreflective sheeting") according to one embodiment of the present disclosure, and particularly, a prismatic retroreflective article 100 according to one embodiment of the present disclosure. The retroreflective article 100 comprises an overlay 102, a transparent body portion 104, and an optical layer 106. The retroreflective article 100 has a front 101 and a rear 103, each layer making up the prismatic retroreflective article 100 having a respective front surface and rear surface. For example, the body portion 104 has a front surface 105 and a rear surface 107, and the optical layer 106 has a front surface 109 coupled to the rear surface 107 of the body portion 104, and a rear surface 111. The polymeric materials that compose the retroreflective article 100 can be light transmissible, and in some cases, transparent.

The overlay 102 includes a front surface 110 and a rear surface 112 adapted to be coupled to the front surface 105 of the body portion 104. As shown in FIG. 1, the overlay 102 includes a graphic 114, such that the graphic 114 is buried with respect to the front surface of the overlay 102.

The coefficient of retroreflection ($R_A$), or retroreflectivity, of the retroreflective article 100 can vary depending on the desired properties of the finished article. In some embodiments, the coefficient of retroreflection of the retroreflective article 100 is sufficient to pass the ANSI/ISEA 107-2004 standard and the EN471 specification at 0 degrees and 90 degrees orientation angles. In some embodiments, the coefficient of retroreflection ranges from about 5 candelas per lux per square meter ($cd/lux/m^2$), for colored retroreflective layers, to about 1500 $cd/lux/m^2$, when measured at 0.2 degree observation angle and +5 degree (or −4.0 degree) entrance angle according to ASTM E-810 test method or CIE 54.2; 2001 test method for coefficient of retroreflection of retroreflective sheeting. In some embodiments, the coefficient of retroreflection of the retroreflective article 100 is at least about 330 $cd/lux/m^2$, in some embodiments, at least about 500 $cd/lux/m^2$, and in some embodiments, at least about 700 $cd/lux/m^2$, as measured according to ASTM E-810 test method or CIE 54.2; 2001 test method at 0.2 degree observation angle and +5 degree (or −4.0 degree) entrance angle.

As described above, the overlay 102 includes a graphic 114 that is buried with respect to the front surface 110 of the overlay 102. As a result, when the overlay 102 is coupled to a substrate (e.g., the body portion 104 of the retroreflective article 100, as shown in FIG. 1), the graphic 114 is also buried with respect to the front of the substrate (e.g., the front 101 of the retroreflective article 100, as shown in FIG. 1). By employing a buried graphic 114, the graphic 114 can be protected (e.g., by the front portion of the overlay 102), such that the graphic 114 (and any underlying substrate) is provided with one or more of stain resistance, low coefficient of friction, chemical resistance, weather resistance, toughness, and abrasion resistance.

The graphic 114 can be a continuous color or the graphic 114 can include an image, pattern or design, which is sometimes referred to herein as being "imaged." In some embodiments, the graphic 114 is colored and imaged, such that the graphic 114 includes a design, logo, pattern, or the like, and also includes one or more colors. The term "graphic" is used herein to refer to a color, an image, and any combination thereof.

With reference to FIG. 1, the graphic 114 includes a checkered pattern and has imaged portions (e.g., checkers) 118 and non-imaged portions (e.g., spaces between the checkers) 120. The checkered pattern is shown merely by example and for simplicity. In addition, by way of example only and for simplicity, the imaged portions 118 (e.g., checkers) of the checkered pattern in FIG. 1 are shown as being the same color. However, it should be understood that even a variety of checkered patterns can be employed, where each checker in the checkered pattern is formed of a different color, resolution, color density, opacity, color gradient, or combination thereof. Furthermore, the graphic 114 is not limited to the exemplary checkered pattern shown in FIG. 1, but rather a variety of designs, logos, patterns, text, and combinations thereof, of any number or variety of colors, resolutions, color densities, opacities, color gradients, and combinations thereof, can be employed in the graphic 114.

In some embodiments, the overlay 102, or at least a rear portion of the overlay 102 adjacent the rear surface 112 of the overlay 102, includes a bonding material. In some embodiments, the bonding material is provided by a bonding layer, such as the bonding layer 234 shown in FIGS. 3-4 and the bonding layer 334 shown in FIGS. 5-6. Such a bonding layer can form all or a portion of the overlay 102, and the bonding material can form at least a portion of the rear surface 112 of the overlay 102 to allow the overlay 102 to be coupled to a substrate at least partially via the bonding material.

The graphic 114 can be formed such that it does not interfere with the functionality of the bonding material or inhibit the overlay from being coupled to a substrate. The phrases "applying a graphic" and "applying a graphic material" are used to refer broadly to a variety of application methods, including, but not limited to, printing, (e.g., with heat-softenable/thermoplastic inks, for example, using Xerox Phaser printers and Tektronix solid ink sticks (available from Xerox, Norwalk, Conn.)), hot stamping, thermal mass transfer, static charge printing, and sublimation.

The term "printing" is used to refer broadly to a variety of printing methods, including, but not limited to, gravure, offset, flexographic, lithographic, static charge printing, ion deposition (also referred to as electron beam imaging (EBI)), magnetographics, inkjet printing, dye sublimation printing, screen printing, and combinations thereof.

The phrase "static charge printing" is used to refer broadly to electrostatic printing, electrographic printing, electrophotographic printing (including laser printing and xerography), or a combination thereof.

Three exemplary methods of forming the graphic 114 so as not to impede the bonding properties of the overlay 102 are described in greater detail below and in the Examples section, and include (1) thermal mass transfer, (2) static charge printing, and (3) sublimation. In thermal mass transfer and static charge printing, the graphic 114 is formed by applying a graphic material to the rear surface 112 of the overlay 102, the graphic material having similar (or the same) bonding characteristics as the bonding material so as not to substantially impede the bonding properties of the overlay 102 (see FIGS. 3-4 and the accompanying description below). In sublimation, the graphic 114 is infused into the rear portion of the overlay 102, for example, so as not to substantially interfere with the bonding properties of the overlay 102 (see FIGS. 5-6 and the accompanying description below).

The body portion 104 is shown in FIG. 1 by way of example only, however, it should be understood that the body portion 104 can be an optional component of the retroreflective article 100. In embodiments that do not employ the body portion 104, the overlay 102 can be coupled (e.g., directly) to the optical layer 106, such that the optical layer 106 serves as the substrate to which the overlay 102 is coupled.

The body portion 104, if employed, can be formed of a flexible, transparent polymeric material having an elastic modulus of less than about $13 \times 10^8$ Pa (1.3 GPa), in some embodiments, less than about $10 \times 10^8$ Pa, in some embodiments, less than about $7 \times 10^8$ Pa, in some embodiments, less than about $5 \times 10^8$ Pa, and in some embodiments, less than about $3 \times 10^8$ Pa. The body portion 104 generally functions to protect the retroreflective article 100 from environmental elements and/or to provide mechanical integrity to the retroreflective article 100.

A flexible body portion 104 allows the retroreflective article 100 to be used in a variety of applications that require a certain degree of flexibility and/or conformability, including, but not limited to, one or more of a trailer tarpaulin; a roll-up sign; high visibility apparel and clothing such as shirts, pants, caps, coveralls, and vests; temporary traffic signage and delineation; and marine applications, such as personal flotation devices and life rafts.

The body portion 104 can be formed of a variety of polymeric materials, including, but not limited to, one or more of fluorinated polymers, ethylene copolymers, ionomeric ethylene copolymers, low density polyethylenes, plasticized vinyl halide polymers such as plasticized poly(vinylchloride), polyethylene copolymers, aliphatic and aromatic polyurethanes, methyl methacrylate butyl methacrylate coplymers, polyvinylbutyral, copolyesters, and combinations thereof.

As shown in FIG. 2, the optical layer 106 includes a rear surface 111 that is structured and formed of a plurality of cube-corner optical elements 126. Each cube-corner optical element 126 is defined by three open-air exposed planar facets 128 and an apex 130 arranged to form a trihedral pyramidal prism. The cube-corner optical elements 126 are disposed as matched pairs in an ordered array on one side of the retroreflective sheeting 100 (and are shown to protrude out of the page when viewed from the perspective of FIG. 2). The planar facets 128 may for example be substantially perpendicular to one another (as in the corner of a room). The angle between the facets 128 of adjacent cube corner optical elements can be substantially the same for each cube-corner element 126 in the array and can be about 90°. The angle between adjacent cube corner optical elements 126 may however deviate from 90° as described, for example, in U.S. Pat. No. 4,775,219. Although the apex 130 of each cube-corner optical element 126 may be vertically aligned with the center of the cube-corner optical element base as described, for example, in U.S. Pat. No. 3,684,348, the apex 130 also may be canted as described, for example, in U.S. Pat. No. 4,588,258. Thus, the present disclosure is not limited to any particular cube-corner geometry, and any of the geometries now known or hereafter developed may be employed.

In use, the retroreflective article 100 is arranged with its front 101 being disposed generally toward anticipated locations of intended observers and sources of incident light. Light can enter the retroreflective article 100 through the front 101, can then pass through the overlay 102 (including, optionally, at least a portion of the graphic 114, depending on whether the graphic 114 is continuous or imaged), through the body portion 104 and strike the planar facets 128 of the cube-corner optical elements 126, and return in the direction generally parallel to (i.e., toward) that which it came, such that the cube-corner optical elements 126 are internally-reflecting. A representative path along which light may travel is shown schematically in FIG. 4 with respect to retroreflective article 200. In some embodiments where the retroreflective article 100 is likely to be exposed to moisture, the cube-corner optical elements 126 can be encapsulated with a seal film (not shown). Such sealing methods can include ultrasonic, radio frequency, and/or thermal bonding methods. In some embodiments, the rear surface 111 of the optical layer 106 can include a specularly reflective material (e.g., a metal layer), and in some embodiments, the cube-corner optical elements 126 can be formed of, or coated with, a more hydrophobic/ oleophilic material to protect the rear structured surface 111. The specularly reflective material, if employed, can be applied to the rear surface 111 of the optical layer 106 in a variety of ways, including, but not limited to vapor coating, chemical deposition, and combinations thereof.

In some embodiments, the cube-corner optical elements 126 are formed of a transparent polymeric material having an elastic modulus of greater than about $14 \times 10^8$ Pa, in some embodiments, greater than about $16 \times 10^8$ Pa, in some embodiments, greater than about $18 \times 10^8$ Pa, and in some embodiments, greater than about $20 \times 10^8$ Pa. Thus, in some embodiments, the cube-corner elements 126 can be formed of a polymeric material that has an elastic modulus that is at least about $1 \times 10^8$ Pa greater than the polymeric material of the body portion 104, and may be at least about $5 \times 10^8$, about $9 \times 10^8$, about $11 \times 10^8$, about $10^8$, or even about $17 \times 10^8$ Pa greater than the polymeric material of the body portion 104.

The optical layer 106 can be formed of a variety of polymeric materials, including, but not limited to, one or more of acrylic polymers such as poly(methyl methacrylate); polycarbonates; cellulosics such as cellulose acetate, cellulose (acetate-co-butyrate), cellulose nitrate; epoxies; polyesters such as poly(butylene terephthalate), poly(ethylene terephthalate); fluoropolymers such as poly(chlorofluoroethylene), poly(vinylidene fluoride); polyvinyl chloride; polyamides such as poly(caprolactam), poly(amino caproic acid), poly(hexamethylene diamine-co-adipic acid), poly(amide-co-imide), and poly(ester-co-imide); polyetherketones; poly(etherimide); polyolefins such as poly(methylpentene); poly(phenylene ether); poly(phenylene sulfide); poly(styrene) and poly(styrene) copolymers such as poly(styrene-co-acrylonitrile), poly (styrene-co-acrylonitrile-co-butadiene); polysulfone; silicone modified polymers (i.e., polymers that contain a small weight percent (e.g., less than 10 weight percent) of silicone) such as silicone polyamide and silicone polycarbonate; fluorine modified polymers such as perfluoropoly(ethylene-terephthalate); and combinations of the above polymers, such as a poly(ester)/poly(carbonate) blend, a fluoropolymer/acrylic polymer blend, urethane acrylates, epoxy acrylates, halogenated epoxy acrylates, and the like.

Additional materials suitable for forming the optical layer 106 are reactive resin systems capable of being cross-linked by a free radical polymerization mechanism by exposure to actinic radiation, such as electron beam, ultraviolet light, or visible light. Additionally, these materials may be polymerized by thermal means with the addition of a thermal initiator such as benzoyl peroxide. Radiation-initiated cationically polymerizable resins also may be used.

In some embodiments, the body portion 104 and the optical layer 106 are integrally formed of the same material into a cube-corner sheeting having a generally planar front surface 105 and an array of cube corner optical elements 126 protruding from its rear surface (i.e., forming the rear structured surface 111). Such cube-corner sheeting can be formed by casting, thermal embossing, extrusion, injection molding, or a combination thereof. In some embodiments, as shown in FIG. 1, and described above, the body portion 104 and the optical layer 106 are formed of different materials (e.g., to achieve the desired level of flexibility without diminishing retroreflectivity). In such embodiments, by way of example only, the body portion 104 can be extruded, and the optical layer 106 can be cast and cured to the body portion 104.

In some applications, the retroreflective sheetings are used on flat inflexible articles, for example, road signs and barricades. However, in some applications, the sheetings are used on irregular or flexible surfaces. For example, a retroreflective sheeting may be adhered to the side of a truck trailer, which may require the sheeting to pass over corrugations and/or protruding rivets, or the sheeting may be adhered to a flexible substrate such as a road worker's safety vest. In situations where the underlying surface is irregular or flexible, the retroreflective sheeting can possess good conformability and flexibility (e.g., by employing a relatively flexible body portion 104) but, in some embodiments, not at the expense of sacrificing retroreflective performance (e.g., by employing a relatively rigid optical layer 106 to maintain optical properties).

Whether integrally formed with the body portion 104 or formed separately, the optical layer 106 can include a multitude of interconnected, cube-corner optical elements (e.g., the optical layer 106 can include a land area), or the optical layer 106 can include a plurality of discrete or independent cube-corner optical elements 126, as shown in the embodiment illustrated in FIGS. 1-2. The term "discrete" as used with respect to cube-corner optical elements 126 refers to each element being detached or independent from an adjacent cube-corner optical element 126. The use of discrete cube-corner optical elements 126 can increase the flexibility of the retroreflective article 100 because each cube-corner optical element 126 can move independently of the other cube-corner optical elements 126. Discrete cube-corner optical elements 126, such as those shown in FIGS. 1-2, can be prepared, for example, by casting directly onto a film (e.g., the body portion 104), such as described in U.S. Pat. No. 5,691,846, which is incorporated herein by reference.

Retroreflective articles employing a body portion formed of a low elastic modulus polymeric material and cube-corner elements formed of a higher elastic modulus polymeric material and methods of making such articles are described in greater detail in US Patent Application Publication No. 2007/0014011 and U.S. Pat. Nos. 7,185,993, 6,350,035, 5,988,820, 5,691,846, and 5,450,235, the disclosures of which are incorporated herein by reference.

The optical layer 106 is illustrated in FIGS. 1-2 and described above as being a prismatic retroreflective article. However, it should be understood that other types of optical layers can be used in the retroreflective article 100. As mentioned above, the retroreflective article 100 can include microsphere-based optics, such that the optical layer includes microsphere optical elements, in lieu of or in addition to cube-corner optical elements. In embodiments employing microsphere optical elements, the retroreflective article 100 can be at least one of an encapsulated-lens retroreflective article, such as that disclosed in U.S. Pat. Nos. 4,025,159 (McGrath), 5,064,272 (Bailey), and 6,677,028 (Lasch); an enclosed-lens retroreflective article, such as that disclosed in 4,767,659 (Bailey), 4,983,436 (Bailey), and 5,262,225 (Wilson); or a combination thereof.

Figure 3:
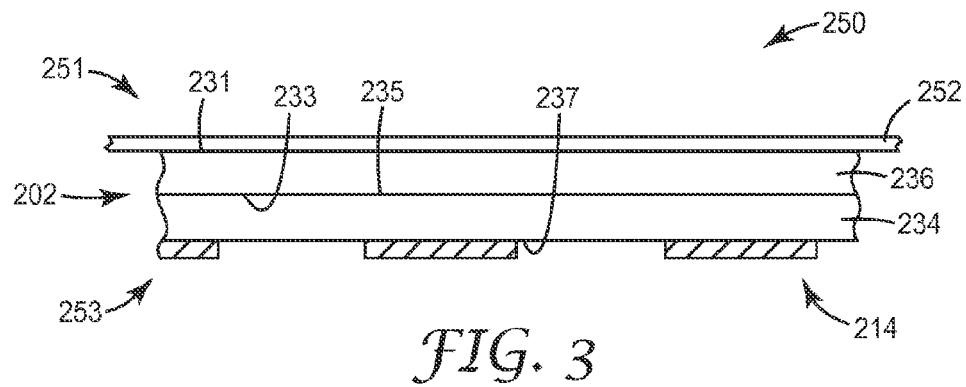
FIG. 3 is a schematic side view of a transfer article according to one embodiment of the present disclosure.
Figure 4:
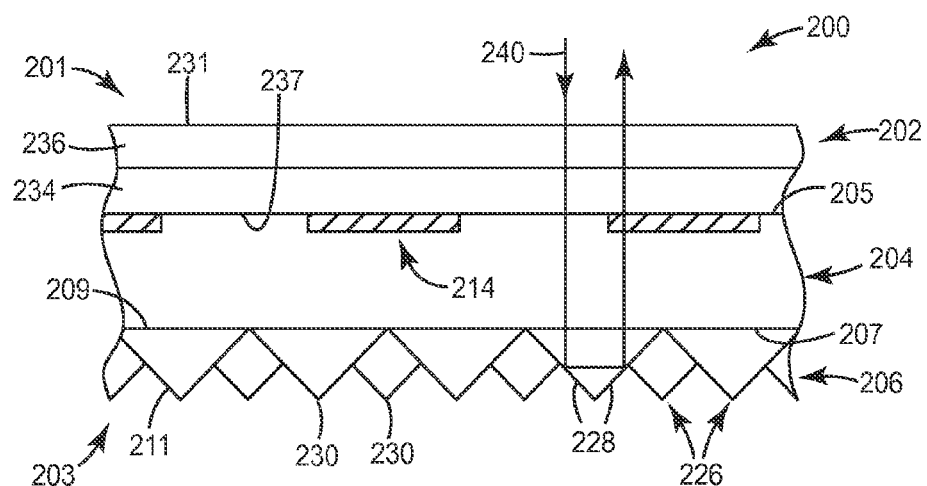
FIG. 4 is a schematic side view of a retroreflective article according to another embodiment of the present disclosure.

FIGS. 3-4 illustrate an overlay 202 according to another embodiment of the present disclosure, wherein like numerals represent like elements. FIG. 3 illustrates the overlay 202 as a portion of a transfer article 250 adapted to transfer the overlay 202 to a substrate, and FIG. 4 illustrates the overlay 202 as a portion of a retroreflective article 200. The transfer article 250 and the retroreflective article 200 each share many of the same elements and features described above with reference to the illustrated embodiment of FIGS. 1-2. Accordingly, elements and features corresponding to elements and features in the illustrated embodiment of FIGS. 1-2 are provided with the same reference numerals in the 200 series. Reference is made to the description above accompanying FIGS. 1-2 for a more complete description of the features and elements (and alternatives to such features and elements) of the embodiments illustrated in FIGS. 3-4.

With reference to FIG. 3, the transfer article 250 has a front 251 and a rear 253, and includes a carrier 252, an overlay 202, and a graphic 214. Although the carrier 252 is not required, the carrier 252 can be used for ease of handling of the overlay 202, such as in application of the graphic 214 to the overlay 202 and in coupling of the overlay 202 to a substrate. The carrier 252 can be formed of a variety of materials, including, but not limited to, paper; polymers, such as polyester, polypropylene, polyamide (e.g., nylon), etc.; and combinations thereof.

In some embodiments, the overlay 202 can include a single layer, and in some embodiments, the overlay 202 can include more than one layer. For example, as shown in FIG. 3, the overlay 202 includes a bonding layer 234 and a barrier layer 236. In some embodiments, the overlay 202 can include just the bonding layer 234 or just the barrier layer 236.

In the embodiment illustrated in FIG. 3, the barrier layer 236 includes a front surface 231 that is coupled to the carrier 252 and a rear surface 233. The bonding layer 234 includes a front surface 235 that is coupled to the rear surface 233 of the barrier layer 236, a and a rear surface 237 that is at least partially formed of a bonding material and at least partially formed of a graphic material that forms the graphic 214. The rear surface 237 of the bonding layer 234 is also adapted to be coupled to a substrate (e.g., a front surface 205 of a body portion 204 of the retroreflective article 200, as shown in FIG.

4). The rear surface 237 forms the rear surface of the overlay 202, and the front surface 231 of the barrier layer 236 forms the front surface of the overlay 202.

The barrier layer 236 can be employed in the overlay 202 to provide a flexible, printable and stain resistant layer to the overlay 202, and ultimately to whatever substrate to which the overlay 202 is coupled. The barrier layer 236, if employed, can be formed of a variety of thermoset or thermoresistive materials, which may be rigid or flexible to meet or exceed the in-use requirements of the intended final product that comprises the overlay 202 coupled to a substrate. Examples of suitable materials for the barrier layer 236 include, but are not limited to, cross-linked polyurethane chemistries (e.g., polyurethanes and polyurethane acrylates), polyacrylates, or a combination thereof. Particularly, the barrier layer 236 can include a reaction product of a hard component, a soft component and a cross-linking agent. In some embodiments, the resulting cured barrier layer 236 has a percent elongation of at least about 150%, and in some embodiments, a percent elongation of at least about 200%.

The hard component and/or the soft component of the barrier layer 236 can include functional end groups or functional side chains such that the components can be reacted to form a cross-linked network. In some embodiments, the hard component can include at least one hydroxy functional thermoplastic polyurethane, acrylic polymer, polymeric polyol or mixture thereof and can have a percent elongation of up to about 150%. In some embodiments, the soft component can include at least one hydroxy functional thermoplastic polyurethane, non-reactive polyurethane, polymeric polyol, or mixture thereof and can include a percent elongation of at least about 200%, and particularly, ranging from about 200% to about 800% after cross-linking. In some embodiments, the cross-linking agent is a diisocyanate or a polyisocyanate.

The bonding layer 234, when employed, is chosen such that it does not diminish the flexibility, printability and stain resistance of the barrier layer 236, but rather improves the adhesion between the barrier layer 236 and the substrate to which the overlay 202 is to be coupled (e.g., the body portion 204 of the retroreflective article 200). The bonding layer 234 can be formed of a variety of bonding materials, including, but not limited to, a thermally activated bonding material (e.g., thermoplastic polyurethanes). Examples of suitable bonding materials include, but are not limited to, acrylics, polyesters, rubbers (e.g., clear rubbers), plasticized polyvinyl chloride, urethane heat-activated materials, or a combination thereof. Examples of suitable urethanes that can be blended for various softening points include, but are not limited to, PERMUTHANE SU-26-248 urethanes, available from Stahl, Peabody, MA, and DESMOLAC 4340 urethanes available from Bayer, Leverkusen, Germany. The bonding material can include a bonding temperature at which the bonding material would exhibit adhesive properties, or tackiness. In some embodiments, the bonding temperature is greater than room temperature for ease of handling and control.

In some embodiments, the bonding material can also be cured or crosslinked (e.g., after the overlay 202 is coupled to the desired substrate). In some embodiments, the bonding material can be thermally cured or crosslinked at an activation temperature that would be higher than the bonding temperature to allow the bonding material to be heated to a first bonding temperature to couple the overlay 202 to a substrate, and then heated to a higher temperature (e.g., the activation temperature) to cure the bonding layer 234.

In some embodiments, the barrier layer 236 and/or the bonding layer 234 can include one or more additives to impart properties such as coating uniformity, conspicuity, aesthetics, release properties, outdoor weatherability, or a combination thereof. Examples of suitable additives can include, but are not limited to, surfactants, flow control agents, wetting agents, colorants (e.g., pigments and/or dyes), ultraviolet (UV) stabilizers, hindered amine light stabilizers (HALS), or a combination thereof.

In some embodiments, the barrier layer 236 and/or the bonding layer 234 are coated, transfer laminated, (co-)extruded, or a combination thereof (e.g., onto the carrier 252) to form the overlay 202. The graphic 214 can then be applied to the overlay 202, and the overlay 202 comprising the graphic 214 can be applied to a substrate.

In some embodiments, the bonding layer 234 is not provided as a separate layer, but rather is incorporated into the barrier layer 236 by admixing a bonding layer composition, or major component thereof, with the barrier layer composition, such that the rear portion of the overlay 202 comprises the bonding material.

The formulations and methods of making such a barrier layer (also sometimes referred to as an "SR layer" for its stain-resistant properties) and a bonding layer are described in greater detail in U.S. Pat. Nos. 6,660,390, 6,723,433, and 6,953,624, the disclosures of which are incorporated herein by reference.

Depending on the substrate to which the overlay 202 is to be coupled and the desired use of the overlay 202 or the final product comprising the overlay 202, the barrier layer 236 and the bonding layer 234 can have various properties. For example, in some embodiments (e.g., when the overlay 202 is used in a retroreflective article), the barrier layer 236 can be rigid, flexible, optically transparent or at least light transmissible, and can have a higher melting point than the bonding layer 234. In some embodiments, the bonding layer 234 can be optically transparent and can have a melt flow point that exceeds the intended in-use temperature requirement of the final product.

In some embodiments, as shown in FIGS. 3-4, the graphic 214 forms a layer formed of graphic material that forms at least a portion of the rear surface 237 of the overlay 202. In such embodiments, the graphic material also has a bonding temperature that is greater than room temperature so as to maintain the adhesive properties of the overlay 202. That is, even though the graphic 214 is formed on the rear surface 237 of the bonding layer 234, the graphic material forming the graphic 214 does not substantially shield, deaden, or disrupt the bonding properties of the bonding layer 234. In some embodiments, at least a portion of the graphic material can be formed of the same material as that of the bonding material, or vice versa. In some embodiments, the graphic material can have substantially the same bonding temperature as that of the bonding material, such that the bonding material and the graphic material can be bonded to a substrate at the same temperature.

In such embodiments, the graphic material can be formed of a variety of thermoplastic materials, including, but not limited to, polyester, acrylic, vinyl, polymethyl methacrylate (PMMA; e.g., highly pigment loaded hot melt PMMA), polystyrene, and combinations thereof.

In some embodiments, the graphic material can be formed of a thermoset or a thermoresistive material. In addition, in some embodiments, the graphic material can be formed of a cross-linkable polymer, including radiation-curable cross-linkable polymers, thermally cross-linkable polymers, and combinations thereof. In such embodiments, the graphic material can be heated to a first bonding temperature to couple the overlay 202 to a substrate, and then heated to a higher temperature or irradiated (e.g., an activation temperature) to cure the graphic material.

Particular examples of suitable graphic materials for the graphic 214 illustrated in FIGS. 3 and 4 can include, but are not limited to, thermoplastic inks; thermal mass transfer inks (e.g., polymethyl methacrylate, polystyrene, etc.); toners for static charge printing (e.g., polyester, acrylic, vinyl, and combinations thereof, such as 3M™ SCOTCHPRINT™ electrostatic toners (available from 3M Company, St. Paul, Minn.)); and combinations thereof.

As described above, a variety of methods can be used to obtain the graphic 214, such that the graphic material forming the graphic 214 forms at least a portion of the rear surface 237 of the overlay 202, as shown in FIG. 3, including, but not limited to, printing, hot stamping, thermal mass transfer, static charge printing, and combinations thereof.

In general, thermal mass transfer processes use a donor sheet (e.g., a "ribbon" or "foil") and a receptor sheet or substrate (e.g., the underside/rear surface 237 of the overlay 202 of the present disclosure). The thermal mass transfer donor sheet can include a carrier layer and a colorant layer with at least one thermally transferable colorant (e.g., a dye or a pigment) in a heat-softenable binder. A graphic can be formed on the receptor sheet by selectively transferring graphic material thereto from the donor sheet (e.g., by heating the donor sheet in an imagewise manner). Material to be transferred from the donor sheet is selected by a thermal printhead, which can include small, electrically heated elements which can be operated by signals from a computer in order to transfer graphic material from the donor sheet to areas of the receptor sheet to obtain a desired graphic. For example, the colorant layer can be softened by imagewise heating (and sometimes a receptor layer on the receptor sheet can be contemporaneously softened), and the softened area of the colorant layer can be transferred to the receptor sheet.

Suitable thermal mass transfer media can include, but are not limited to, one or more of ribbons, rolls, foils, solid ink sticks, and combinations thereof. Examples of printers that can be used in the thermal mass transfer process include, but are not limited to, DATAMETRICS™ CONDOR™ printers (available from 3M Company, St. Paul, Minn.) which can use a variety of thermal transfer ribbons, such as IIMAK® DURACOAT® Process and Spot Color Rolls (e.g., Series DC300 rolls; available from International Imaging Materials, Inc., IIMAK, Amherst, N.Y.); Gerber Scientific Products printers (e.g., GerberColor GCT series foils, available from Gerber Scientific Products, South Windsor, Conn.); Matan Digital Printers (available from Matan USA, Williamsville, N.Y.), which can use a variety of thermal mass transfer ribbons, such as the IIMAK® DURACOAT® Process and Spot Color Rolls; and combinations thereof.

In general, static charge printing uses electrostatic means to form and develop a latent electrostatic graphic on a graphic transfer sheet (e.g., a single sheet or a continuous web) or on a drum (e.g., a cylindrical drum). The graphic transfer sheet or drum moves past a stylus writing head which deposits a charge having a varying charge density to define a latent electrostatic graphic. After passing the writing head, the graphic transfer sheet (or drum) passes (or is rotated past) a toning station comprising a toner applicator adapted to apply toner to the graphic transfer sheet (or drum) to form a toned image conforming to the latent electrostatic graphic, which can then be deposited onto a receptor sheet or substrate (e.g., the underside/rear surface 237 of the overlay 202 of the present disclosure). The toner can be in the form of a solid (powder), a liquid, or a combination thereof.

Suitable static charge printers can include, but are not limited to, Xeikon DCP-1 digital electrophotographic presses (available from Xeikon, Mortsel, Belgium), 3M™ SCOTCHPRINT™ 2000 electrostatic printer (available from 3M Company, St. Paul, Minn.), Canon CLC color laser copier (available from Canon, Inc., Tokyo, Japan), and combinations thereof. Such static charge printers can use a variety of toners (e.g., transparent colors), including, but not limited to Xeikon GP2200 and Xeikon V2 series toner powders (available from Xeikon, Mortsel, Belgium).

In embodiments such as those shown in FIG. 3, where the graphic 214 forms at least a portion of the rear surface 237 of the overlay 202, the graphic 214 can be varied in graphic material density and/or the type of image used in order to balance the desired graphic (e.g., color, intensity of color, brightness of color, opacity, image resolution, etc., and combinations thereof) with the bonding properties of the overlay 202.

As mentioned above, FIG. 4 shows the overlay 202 as a portion of the retroreflective article 200. In FIG. 4, the overlay 202 has been coupled to the front surface 205 of the body portion 204, such that the retroreflective article 200 includes the overlay 202 (including the barrier layer 236, the bonding layer 234 and the graphic 214), the body portion 204 coupled to the rear surface 237 of the overlay 202, and an optical layer 206 having a front surface 209 coupled to a rear surface 207 of the body portion 204, and a rear structured surface 211. The front surface 231 of the barrier layer 236 forms the frontmost surface at the front 201 of the retroreflective article 200, and the rear structured surface 211 of the optical layer 206 forms the rearmost surface at the rear 203 of the retroreflective article 200.

In general, the method for preparing the overlay 202 bearing a graphic and the retroreflective article 200 can include preparing the barrier layer 236 to form the frontmost/outermost portion of the overlay 202. For example, in some embodiments, the barrier layer 236 is formed by first preparing a barrier layer premix (e.g., comprising one or more polymers and one or more appropriate solvents) and then forming a barrier layer solution that comprises the barrier layer premix, combined with other components (e.g., other polymers, solvents, additives, etc.). In some embodiments, the barrier layer 236 can then be mixed with a crosslinker (if applicable), coated onto the carrier 252, and dried. The bonding layer 234 can be prepared by combining the necessary components (e.g., polymers, solvents, additives, etc.) to form a bonding layer solution. The bonding layer solution can then be mixed with a crosslinker (if applicable), coated onto the underside/rear surface of the barrier layer 236, and dried, forming the transfer article 250 shown in FIG. 3. In some embodiments, the transfer article 250 can be stored, for example, in a rolled format (e.g., the bonding layer 234 can be covered with a liner), and the barrier layer 236 and the bonding layer 234 can be allowed to cure. A graphic can be applied to the underside/rear surface of the bonding layer 234 to form the overlay 202 bearing the graphic 214.

The transfer article 250 comprising the overlay 202 bearing the graphic 214 can then be coupled to additional layers to form the retroreflective article 200. For example, in some embodiments, the bonding layer 234 can be heat laminated to the previously-formed body portion 204 and/or the optical layer 206, and the carrier 252 can be removed, to form the retroreflective article 200 shown in FIG. 4.

In some embodiments, the overlay 202 bearing the graphic 214 can be coupled to the body portion 204, and the optical layer 206 can then be formed on the rear surface 207 of the body portion 204, for example, following a microreplication process, such as a cast and cure process. Other processes for forming the retroreflective article 200 comprising the overlay 202 bearing the graphic 214 can also be contemplated and should be understood to be included in the present disclosure.

The rear structured surface 211 of the optical layer 206 has generally the same structure as that of the retroreflective article 100, shown in FIG. 2. As shown in FIG. 4, the rear structured surface 211 of the optical layer 206 includes a plurality of cube-corner optical elements 226. Each cube-corner optical element 226 is defined by three open-air exposed planar facets 228 and an apex 230 arranged to form a trihedral pyramidal prism.

In use, the retroreflective article 200 is arranged with its front 201 being disposed generally toward anticipated locations of intended observers and sources of incident light. As shown by arrow 240 in FIG. 4, light enters the retroreflective article 200 through the front 201. The light then passes through the overlay 202 (including, optionally, at least a portion of the graphic 214, depending on whether the graphic 214 is continuous or imaged), through the body portion 204, strikes the planar facets 228 of the cube-corner optical elements 226, and returns in the direction generally parallel to (i.e., toward) that which it came, such that the cube-corner optical elements 226 are internally-reflecting.

A variety of methods can be used to couple the overlay 202 to a substrate such as the body portion 204 and optical layer 206, including, but not limited to, applying heat, pressure or a combination thereof, for example by using a heat laminator, a hot press, a vacuum application, or a combination thereof.

FIGS. 3-4 show the graphic 214 as protruding slightly rearwardly from the rear surface 237 of the overlay 202 into the body portion 204. However, it should be understood that FIGS. 3-4 are schematic representations only and are only meant to be illustrative and not limiting. It should be further understood that depending on the type of graphic material used, the material makeup of the body portion 204, and the conditions under which the overlay 202 is coupled to the body portion 204, it is possible that the graphic 214 may or may not become embedded into the substrate (e.g., the body portion 204, the optical layer 206, or another layer or substrate) to which the overlay 202 is coupled.

Figure 5:
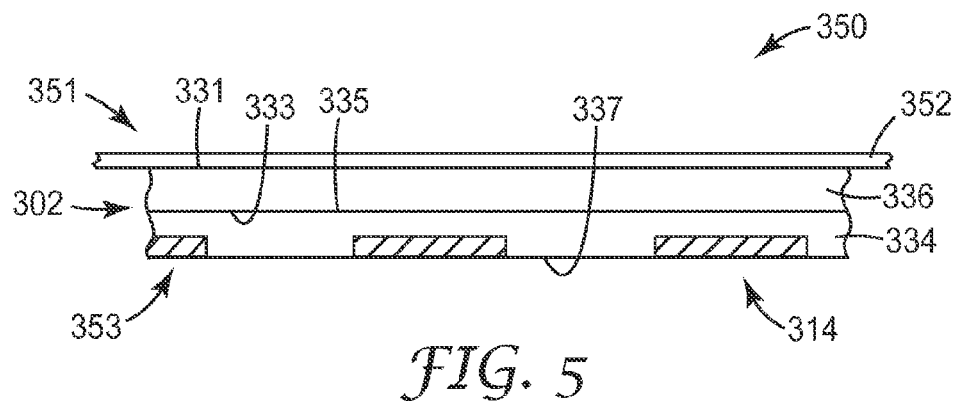
FIG. 5 is a schematic side view of a transfer article according to another embodiment of the present disclosure.
Figure 6:
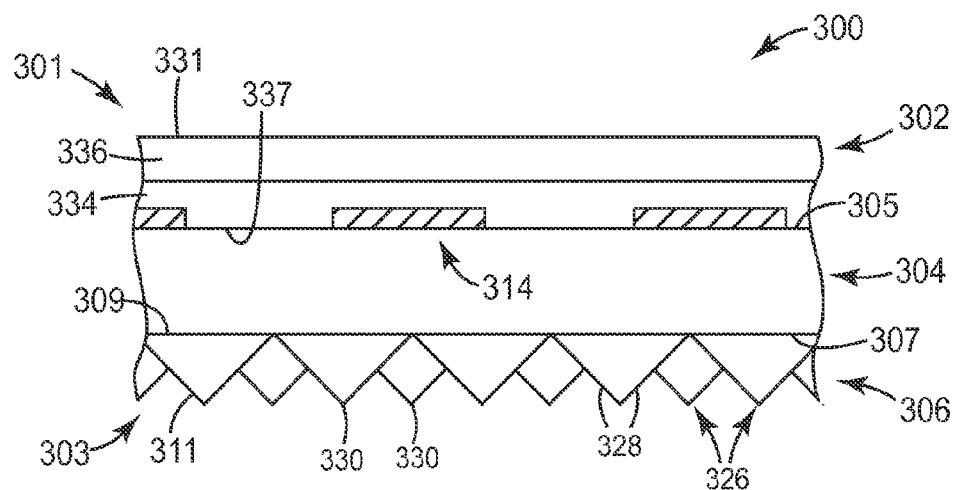
FIG. 6 is a schematic side view of a retroreflective article according to another embodiment of the present disclosure.

FIGS. 5-6 illustrate an overlay 302 according to another embodiment of the present disclosure, wherein like numerals represent like elements. FIG. 5 illustrates the overlay 302 as a portion of a transfer article 350 adapted to transfer the overlay 302 to a substrate, and FIG. 6 illustrates the overlay 302 as a portion of a retroreflective article 300. The transfer article 350 and the retroreflective article 300 each share many of the same elements and features described above with reference to the illustrated embodiments of FIGS. 1-4. Accordingly, elements and features corresponding to elements and features in the illustrated embodiments of FIGS. 1-4 are provided with the same reference numerals in the 300 series. Reference is made to the description above accompanying FIGS. 1-4 for a more complete description of the features and elements (and alternatives to such features and elements) of the embodiments illustrated in FIGS. 5-6.

With reference to FIG. 5, the transfer article 350 has a front 351 and a rear 353, and includes a carrier 352, an overlay 302, and a graphic 314. As described above with respect to the overlay 202 shown in FIGS. 3-4, the overlay 302 can include more than one layer. For example, as shown in FIG. 5, the overlay 302 includes a bonding layer 334 and a barrier layer 336.

As shown in FIG. 5, the barrier layer 336 includes a front surface 331 that is coupled to the carrier 352 and a rear surface 333, however, it should be understood that the carrier 352 is optional, and the overlay 302 can be formed without the carrier 352. The bonding layer 334 includes a front surface 335 that is coupled to the rear surface 333 of the barrier layer 336, a and a rear surface 337 that is at least partially formed of a bonding material. The rear surface 337 of the bonding layer 334 is infused with the graphic 314. The rear surface 337 is adapted to be coupled to a substrate (e.g., a front surface 305 of a body portion 304 of the retroreflective article 300, as shown in FIG. 6). The rear surface 337 forms the rear surface of the overlay 302, and the front surface 331 of the barrier layer 336 forms the front surface of the overlay 302.

In some embodiments, as shown in FIGS. 5-6, the graphic 314 is infused in the rear surface 337 of the overlay 302,), such that the graphic material forming the graphic 314 does not substantially shield, deaden, or disrupt the bonding properties of the bonding layer 334. The graphic 314 is buried with respect to the front surface 331 of the overlay 302 (and any substrate to which the overlay 302 is coupled).

A variety of materials can be employed as a graphic material for the graphic 314 illustrated in FIGS. 5 and 6, including, but not limited to, sublimation colorants, such as sublimation dyes, including, but not limited to, azo dyes (e.g., p-aminoazobenzene; p-nitroazobenzene; 4-N,N-diethylaminoazobenzene; 4-N,N-dimethylaminoazobenzene; 4'-nitro-4-N,N-diethylaminoazobenzene; 4-(4'-methyl-2'-nitrophenylazo)-3-methyl-5-pyrazalone; etc.); anthraquinone dyes (e.g., 1-aminoanthraquinone; 1-amino-4-hydroxyanthraquinone; 1,4-dimethylaminoanthraquinone; 1-hydroxy-3-phenoxy-4-aminoanthraquinone; the butyl or propyl ester of 1,4-diaminoanthraquinone 2-carboxylic acid; etc.); quinoline dyes (e.g., hydroxyquinophthalone, 2-(3-hydroxy-2-quinolyl)-1H-indene-1,3(2H)-dione (CAS #7576-65-0); any of the dyes described in U.S. Pat. Nos. 4,153,412 (Bailey), 5,698, 364 (Janssens), and 5,910,812 (Yamamoto), each of which is incorporated herein by reference; and combinations thereof.

Examples of suitable sublimation colorants or dyes can include, but are not limited to, various water-based and/or oil-based sublimation inks (e.g., available from Hilord Chemical Corporation, Hauppauge, N.Y.), electrostatic sublimation dyes, gravure sublimation dyes (e.g., gravure sublimation dyes available from Transprint USA, Harrisonburg, Va., which are supplied already applied to transfer printing paper, e.g., polyester inks, low energy inks, etc.), and combinations thereof. Examples of suitable sublimation dye printers can include, but are not limited to, ink jet printers made by Mimaki Engineering Company, Ltd. (Japan), Mutoh (Japan), Roland DG Corporation (Japan), Canon (Japan), Hewlett-Packard (Palo Alto, Calif.) and Océ N.V. (Netherlands).

As described above, a variety of methods can be used to obtain the graphic 314, such that the graphic material is infused in the rear portion of the overlay 302 (e.g., the portion of the overlay 302 adjacent the rear surface 337 of the overlay 302), as shown in FIG. 5, including, but not limited to, sublimation, dye sublimation printing, solution dyeing, and combinations thereof.

In general, a sublimation process involves the use of a graphic donor sheet comprising a colorant (e.g., a sublimation dye) in the form of the desired graphic 314. In some embodiments, the desired graphic 314 has an image where orientation is necessary (e.g., text). In such embodiments, the graphic donor sheet can include a graphic comprising the mirror image of the desired graphic 314, such that the resulting graphic 314 has the necessary orientation. When the graphic donor sheet has been formed, it can be used immediately in the sublimation process, or it can be stored (e.g., indefinitely) for later use.

In some embodiments, the graphic donor sheet can be formed by applying sublimation colorants in the form of the desired graphic 314 (or the mirror image of the desired graphic 314) onto the graphic donor sheet. The graphic donor sheet bearing the desired graphic 314 (or the mirror image thereof) can then be sublimated onto the rear surface 337 of the overlay 302.

A variety of methods can be used to apply sublimation colorants to the graphic donor sheet, including, but not limited to, printing (e.g., screen printing, inkjet printing, gravure printing, static charge printing, etc.), coating, dyeing (e.g., solution dyeing, etc.), and combinations thereof.

The graphic donor sheet base material can be formed of a variety of materials, including, but not limited to, paper, film (e.g., polymeric film, such as polyester film, nylon film, etc., and combinations thereof), fabric, non-wovens, coated paper, coated film, coated fabric, coated non-woven, and combinations thereof. The coating on the coated paper, film, fabric and/or non-woven graphic donor sheets can include release coatings (e.g., silicones or other low energy surfaces), imaging coatings (e.g., coatings for inkjet printing, dielectric and conductive coatings for electrostatic printing, etc.), barrier coatings, non-slip coatings, and combinations thereof. An example of a suitable graphic donor sheet is imaging paper, available under the trade designation "3M™ 8616" from 3M Company, St. Paul, Minn. Another example of a suitable graphic donor sheet is dye sublimation paper, available under the trade designation "TEXPRINT XP PLUS" from Beaver Paper, Atlanta, Ga.

The sublimation process generally includes coupling the graphic donor sheet to the rear surface 337 of the overlay 302 (e.g., temporarily) to form a composite, and applying one or both of heat and pressure to the composite. The composite can be heated to a temperature of at least the sublimation temperature of the colorant disposed in the graphic donor sheet to sublimate the colorant at least partially from the graphic donor sheet to a receptor sheet, i.e., the rear surface 337 of the overlay 302. For example, in some embodiments, the composite can be heated to a temperature ranging from about 300° F. to about 350° F.

In some embodiments, the same graphic donor sheet can be used more than once (e.g., on several different receptor sheets), until the amount/density of colorant in the graphic donor sheet has been depleted to an unsuitable level. After the graphic has been transferred to the overlay, the overlay can either be immediately coupled to a substrate, or the overlay can be stored (e.g., indefinitely and with or without the graphic donor sheet coupled to it) for later use.

As mentioned above, FIG. 6 shows the overlay 302 as a portion of the retroreflective article 300. In FIG. 6, the overlay 302 has been coupled to the front surface 305 of the body portion 304, such that the retroreflective article 300 includes the overlay 302 (including the barrier layer 336, the bonding layer 334 and the graphic 314), the body portion 304 coupled to the rear surface 337 of the overlay 302, and an optical layer 306 having a front surface 309 coupled to a rear surface 307 of the body portion 304, and a rear structured surface 311.

In general, the overlay 302 and the retroreflective article 300 can be formed according to the method of preparation described above with respect to FIGS. 3-4, with the exception of the method of applying the graphic 314 to the overlay 302.

The rear structured surface 311 of the optical layer 306 has generally the same structure as that of the retroreflective article 100, shown in FIG. 2. As shown in FIG. 6, the rear structured surface 311 of the optical layer 306 includes a plurality of cube-corner optical elements 326, each of which is defined by three open-air exposed planar facets 328 and an apex 330.

The front surface 331 of the barrier layer 336 forms the frontmost surface at the front 301 of the retroreflective article 300, and the rear structured surface 311 of the optical layer 306 forms the rearmost surface at the rear 303 of the retroreflective article 300.

FIGS. 5-6 show the graphic 314 as protruding slightly forwardly into the rear portion of the overlay 302 to schematically represent that the rear portion of the overlay 302 is infused with the graphic 314. However, it should be understood that FIGS. 5-6 are schematic representations only and are only meant to be illustrative and not limiting. It should be further understood that depending on the type of graphic material (e.g., sublimation dye) used, the material makeup of the body portion 304, and the conditions under which the graphic material is applied to the overlay 302, a variety of results may be possible. For example, the graphic material may be present in more of a gradient, where the concentration of graphic material is greatest toward the rear surface 337 of the overlay 302 and least toward the front surface 331 of the overlay 302 (or the front surface 335 of the bonding layer 334), or the graphic material may migrate further into the overlay 302 than what is represented in FIGS. 5-6, such that the graphic material (or at least a portion or low concentration thereof) extends into the barrier layer 336.

With reference to FIG. 1, the overlay 102 includes a buried graphic 114. As described above, there are several manners in which the graphic 114 can be buried with respect to the front surface 110 of the overlay 102 and, accordingly, the front 101 of the retroreflective article 100. For example, the graphic 114 can be formed by the methods described above for the graphic 214 with reference to FIGS. 3-4, the graphic 114 can be formed by the methods described above for the graphic 314 with reference to FIGS. 5-6, or the graphic 114 can be formed by a combination of the above methods. By way of example only, the graphic 114 is shown schematically and generically in FIG. 1, but it should be understood that any of the graphics 114, 214, 314 described herein, or a combination thereof, can be employed in any retroreflective article 100, 200, 300 of the present disclosure.

The color and/or image production process used to form the graphic 114, 214, 314 can include multiple production steps. For example, the process used to produce the graphic 114, 214, 314 can include none to multiple thermal mass transfer steps, none to multiple static charge printing steps, none to multiple sublimation steps, and combinations thereof.

By way of example only, in some embodiments, a first graphic can be formed in the rear portion of the overlay 102, 202, 302 (e.g., on the rear surface 112, 237, 337 of the overlay 102, 202, 302) by one or more of the processes described above (e.g., thermal mass transfer, static charge printing, etc., and combinations thereof) for forming the graphic 214 shown in FIG. 3, and a second graphic (or another portion of the first graphic) can be formed in the overlay 102, 202, 302 by the sublimation process described above for forming the graphic 314 shown in FIG. 5. Alternatively, a first graphic can be formed in the overlay 102, 202, 302 by a sublimation process, and a second graphic can be formed on the overlay 102, 202, 302 by one or more of the processes described above with respect to the graphic 214 shown in FIG. 3. It should be understood that other combinations of the techniques and processes described herein can be employed to create an overlay 102, 202, 302 having a desired graphic 114, 214, 314.

The following working examples are intended to be illustrative of the present disclosure and not limiting.

EXAMPLES

Table 1 lists the materials and ingredients used in the Examples below. Tables 2 and 3 list the compositions for the barrier layer and the bonding layer, respectively, used in the Examples below.

TABLE 1

MATERIALS

| Trade Designation | Generic Description | Supplier (Location) |
|---|---|---|
| — | methylethylketone | ExxonMobil Chemical Company (Houston, TX) |
| — | toluene | Shell Chemical Co. (Houston, TX) |
| ESTANE 5715 | thermoplastic polyurethane | B.F. Goodrich (Cleveland, OH) |
| DESMOPHEN R221-75 | saturated polyester polyol in solvent; 75% solids in propylene glycol monomethyl ether acetate | Bayer Corporation (Pittsburgh, PA) |
| DESMOPHEN 651A-65 | saturated polyester polyol in solvent; 65% solids in propylene glycol monomethyl ether | Bayer Corporation (Pittsburgh, PA) |
| DOWANOL PM | 1-methoxy-2-propanol | Dow Chemical Company (Midland, MI) |
| SU-26-248 | aliphatic polyurethane in solvent; 25% solids in isopropanol, toluene | Stahl USA (Peabody, MA) |
| TINUVIN 928 | ultraviolet absorber | Ciba Geigy (Hawthrone, NY) |
| TINUVIN 292 | hindered amine light stabilizer | Ciba Geigy (Hawthrone, NY) |
| DESMODUR N75 BA/X | polyisocyanate in solvent; 75% solids in n-butyl acetate, xylene | Bayer Corporation (Pittsburgh, PA) |
| DESMOLAC 4340 | thermoplastic aliphatic polyurethane in solvent; 40% solids in xylene, isobutanol | Bayer Corporation (Pittsburgh, PA) |

TABLE 2

BARRIER LAYER COMPOSITION

|  | Input % solids | separate solution % | total solution actual % | solids (net) | total solids actual % |
|---|---|---|---|---|---|
| Barrier Layer Premix |  |  |  |  |  |
| methylethylketone |  | 47.08% | 10.82% |  |  |
| toluene |  | 31.35% | 7.21% |  |  |
| Estane 5715 (solid pellets) | 100.00% | 21.57% | 4.96% | 0.050 | 12.63% |
|  | subtotal | 100.00% |  |  |  |
| Barrier Layer Solution |  |  |  |  |  |
| Barrier Layer Premix | 21.57% | 26.81% | (See above) |  |  |
| Desmophen R221-75 | 75.00% | 13.88% | 11.90% | 0.089 | 22.73% |
| Desmophen 651A-65 | 65.00% | 10.68% | 9.16% | 0.060 | 15.15% |
| Dowanol PM |  | 11.57% | 9.92% |  |  |
| SU-26-248 | 24.00% | 35.34% | 30.31% | 0.073 | 18.52% |
| Tinuvin 928 | 100.00% | 0.87% | 0.74% | 0.007 | 1.89% |
| Tinuvin 292 | 100.00% | 0.87% | 0.74% | 0.007 | 1.89% |
|  | subtotal | 100.00% | 85.76% |  |  |
| Barrier Layer Crosslinker |  |  |  |  |  |
| Desmodur N75 BA/X | 75.00% |  | 14.24% | 0.107 | 27.19% |
|  | total |  | 100.00% | 0.393 | 100.00% |

TABLE 3

BONDING LAYER COMPOSITION

|  | Input % solids | separate solution % | total solution actual % | solids (net) | total solids actual % |
|---|---|---|---|---|---|
| Bonding Layer Solution |  |  |  |  |  |
| Desmolac 4340 | 40.00% | 13.36% | 13.01% | 0.052 | 20.35% |
| Dowanol PM |  | 11.07% | 10.79% |  |  |
| SU-26-248 | 24.00% | 74.52% | 72.61% | 0.174 | 68.13% |
| Tinuvin 928 | 100.00% | 0.52% | 0.51% | 0.005 | 2.00% |
| Tinuvin 292 | 100.00% | 0.52% | 0.51% | 0.005 | 2.00% |
|  | subtotal | 100.00% | 97.44% |  |  |
| Bonding Layer Crosslinker |  |  |  |  |  |
| Desmodur N75 BA/X | 75.00% |  | 2.56% | 0.019 | 7.52% |
|  | total |  | 100.00% | 0.256 | 100.00% |

Test Methods

Brightness Measurement

Brightness was recorded as the Coefficient of Retroreflection ($R_A$), which was measured at 0.2 degree observation angle and −4.0 degree entrance angle according to ASTM E-810:02 test method.

Color Measurement

Color was recorded as CIE Color Coordinates, which were obtained using a colorimeter commercially available from Hunter Associate Laboratory Inc., Reston, Va. under the trade designation "Hunterlab ColorFlex." The operating conditions for the "Hunterlab ColorFlex" included a D65 illuminate and a 2 degree observation angle, recording the coordinate for CIE Y, x and y (CIE=Commission Internationale d'Eclairage, the International Commission on Illumination). CIE 1931 Chromaticity Diagram uses cartesian coordinates to define a color in color space. According to CIE 1931 Chromaticity Diagram, the Y, x, and y coordinates plot the luminance, color saturation, and hue, respectively.

Wash Durability

The wash durability testing was performed according to the test method ISO 6330-2A (2000). Wash cycles were 12 min. at 60° C. (with rinse and spin cycles as specified in ISO 6330-2A) using WASCATOR® washers (Model FOM71MP, Electrolux Laundry Systems Corporation, Copenhagen, Denmark). Dry cycles were performed every fifth wash cycle for 45 min. at 50° C. using UniDryer dryers (Model UDS-50, UniMac/Alliance Laundry Systems, Ripon, Wis.). The minimum ANSI/ISEA 107-2004 and EN 471 specification at 0 degrees and 90 degrees orientation angles, at a 0.2 degree observation angle and a −4.0 degree entrance angle is 330 cd/lux/m$^2$, as measured according to the above Brightness measurement method.

Examples 1-4

Retroreflective Articles Comprising Overlays Colored and Imaged with Thermal Mass Transfer Inks at Varying Color Densities The following method was used to create the overlay and prismatic retroreflective articles of Examples 1-4:

1. A barrier layer premix was formed according to the composition detailed above in Table 2 and combined with remaining the Barrier Layer components and mixed to completion to form the barrier layer solution, according to the composition detailed above in Table 2.
2. Bonding layer components were combined and mixed to completion to form the bonding layer solution, the composition for which is detailed above in Table 3.
3. At coating time, the barrier layer crosslinker was added to the barrier layer solution.
4. At coating time, the bonding layer crosslinker was added to the bonding layer solution.
5. The barrier layer solution was coated onto a 0.00197"-thick 3M™ SCOTCHPAK™ polyester carrier (available from 3M Company, St. Paul, Minn.), to a thickness of about 0.003" (0.008 cm) and dried at 180° F. (82° C.) for 2 min
6. The net dry barrier layer thickness was about 0.0006" (0.0010 cm).
7. The bonding layer solution was coated onto the underside/rear surface of the barrier layer to a thickness of about 0.003" (0.008 cm) and dried at 180° F. (82° C.) for 2 min, and then dried at 200° F. (93° C.) for 2 min., to form a transfer article comprising the polyester carrier layer and an overlay having both a barrier layer and a bonding layer.
8. The net dry bonding layer thickness was about 0.0006" (0.0010 cm).
9. The transfer article was then laminated to a 0.002"-thick (0.005 cm-thick) polyethylene cover liner, which covered the bonding layer to allow the transfer article to be stored in a rolled format.
10. After a 7-day room temperature (i.e., about 25° C.) storage and post-curing, the polyethylene liner was removed.
11. The rolled transfer article was then unrolled, exposing the underside/rear surface of the bonding layer of the overlay, and a graphic was formed on the underside/rear surface bonding layer. In Examples 1-4, the graphic was formed according to the thermal mass transfer process described below.
12. The bonding layer bearing the graphic having thermoplastic properties was heat laminated at 280° F. to the front surface of the polyvinylchloride (PVC) body portion of 3M™ SCOTCHLITE™ Retroreflective Series 6260 retroreflective article (available from 3M Company, St. Paul, Minn.).
13. The polyester carrier layer was then removed to produce the prismatic retroreflective articles of Examples 1-4, each retroreflective article including an overlay bearing a graphic.

The graphic employed in Examples 1-4 was a checkered pattern consisting of alternating blue checkers. That is, the blue checkers formed the imaged portions of the graphic, and spaces between the blue checkers formed the non-imaged portions of the graphic. Specifically, the graphic used in Examples 1-4 was similar to that of FIG. 1 and included 0.75" (1.9 cm)×0.75" (1.9 cm) squares in a checkerboard pattern with alternating colored (i.e., blue) and non-colored squares, such that the non-colored squares would maintain the color of the layer onto which the graphic was applied. The center-to-center side-by-side distance between colored squares (i.e., the center-to-center distance between alternating colored squares) was 2" (5 cm). Each sample was formed by applying the graphic to the underside/rear surface of the overlay, applying the overlay bearing the graphic to the body portion of the retroreflective article (i.e., as described in steps 11 and 12 of the above-described overlay and retroreflective article preparation process), and cutting a strip of the resulting retroreflective article having dimensions of 2" (5 cm)×8" (20 cm), with the checkered pattern centered on the 2-inch strip.

For Examples 1-4, the graphic included four sections, each section including 2 squares×~10 squares, and corresponding to Example 1, Example 2, Example 3, or Example 4, respectively. Each section of the graphic was applied in a different color density (i.e., fill), as detailed in Tables 4 and 5 below.

The thermal mass transfer process employed in Examples 1-4 was as follows:

1. A 12" (30 cm)×~10' (~3 m) piece of the above-described overlay (i.e., as prepared in step 11 in the overlay and retroreflective article preparation process described above) was secured to a polyester carrier layer with masking tape.
2. The carrier layer and overlay were then loaded into the Gerber Edge II Thermal Mass Transfer printer (available from Gerber Scientific Products, South Windsor, Conn.). Standard Gerber Edge II printing profiles (i.e., "Temperature of the Thermal Printing Head" of about 200° F. (93° C.) and "Print Speed" of 60 linear inches per min (in/min.)), and a Gerber translucent blue foil, GCT-617 (available from Gerber Scientific Products) were used to obtain the graphic at the specified color density.

The brightness (recorded as Coefficient of Retroreflection ($R_A$; cd/lux/m$^2$) and color (recorded as CIE Color Coordinates) for each of Examples 1-4 were obtained according to the methods described above, the results for which are listed in Tables 4 and 5, respectively. Examples 1-4 were each tested for brightness in duplicates, and averages were calculated for each example. In addition, each of Examples 1-4 was tested for color in duplicates ("Sample 1" and "Sample 2"), and an average for each example was obtained for each CIE color coordinate.

TABLE 4

BRIGHTNESS RESULTS FOR EXAMPLES 1-4, RECORDED AS COEFFICIENT OF RETROREFLECTION ($R_A$; cd/lux/m$^2$)

| BRIGHTNESS | | Ex. 1 100% density | Ex. 2 80% density | Ex. 3 60% density | Ex. 4 40% density |
|---|---|---|---|---|---|
| Non-colored | Sample 1 | 697 | 765 | 756 | 670 |
| | Sample 2 | 699 | 789 | 822 | 689 |
| | Average | 698.0 | 777.0 | 789.0 | 679.5 |
| Blue | Sample 1 | 45.5 | 136 | 270 | 370 |
| | Sample 2 | 47.2 | 146 | 307 | 421 |
| | Average | 46.4 | 141.0 | 288.5 | 395.5 |

TABLE 5

COLOR RESULTS FOR EXAMPLES 1-4, RECORDED AS CIE COLOR COORDINATES

| COLOR | | Ex. 1 100% density | Ex. 2 80% density | Ex. 3 60% density | Ex. 4 40% density |
|---|---|---|---|---|---|
| Blue, Sample 1 | color Y | 2.47 | 3.18 | 6.86 | 12.23 |
| | color x | 0.153 | 0.158 | 0.1864 | 0.2213 |
| | color y | 0.113 | 0.1307 | 0.1845 | 0.2327 |
| Blue, Sample 2 | color Y | 2.5600 | 3.3900 | 6.9100 | 12.1200 |
| | color x | 0.1518 | 0.1586 | 0.1877 | 0.2198 |
| | color y | 0.1149 | 0.1354 | 0.1874 | 0.2320 |
| Blue, Average | color Y | 2.5150 | 3.2850 | 6.8850 | 12.1750 |
| | color x | 0.1524 | 0.1583 | 0.1871 | 0.2206 |
| | color y | 0.1140 | 0.1331 | 0.1860 | 0.2324 |

Examples 5-9

Retroreflective Articles Comprising Overlays Colored and Imaged with Thermal Mass Transfer Inks Having Varying Blue Color Coordinates For Examples 5-9, the graphic applied to the overlay included five sections, each section including 2 squares×~10 squares, and corresponding to Example 5, Example 6, Example 7, Example 8 or Example 9, respectively. Each section of the graphic was applied in a different color (i.e., a different blue), as detailed in Tables 6 and 7 below, each at 100% density (i.e., fill).

The overlay and prismatic retroreflective articles of Examples 5-9 were formed according to the same method described above with respect to Examples 1-4, except that the following thermal mass transfer process was used to form the graphic on the underside/rear surface of the bonding layer of the overlay:

A roll of the above-described overlay (i.e., as prepared in step 11 in the overlay and retroreflective article preparation process described above) having dimensions of 12" (30 cm)×~50 yd (~46 m) was loaded onto a roll-to-roll 3M™ Digital License Plate (DLP) Printing System (available from 3M Company, St. Paul, Minn.) comprised of an unwinding roll, a winding roll, and a 3M™ DLP printer, equipped with four KYOCERA™ printheads (Type KGT-301-12MPG37-3M, available from 3M Company) positioned between the unwinding roll and the winding roll. For each of Examples 5-9, one of the printheads was loaded with the 3M™ Digital License Plate Thermal Transfer Ribbons Series TTR1300 (a series of 21 colors, available from 3M Company, St. Paul, Minn.) blue ribbon of choice to form the checkered graphic. For Example 5, the dark blue ribbon was used (TTR1301, available from 3M Company, St. Paul, Minn.); for Example 6, the blue ribbon was used (TTR1310); for Example 7, the bright blue ribbon was used (TTR1308); for Example 8, the ocean blue ribbon was used (TTR1309); and for Example 9, the cyan ribbon was used (TTR1304). For each of Examples 5-9, the printing speed was 3.0 inches (7.6 cm) per second.

The brightness (recorded as Coefficient of Retroreflection ($R_A$; cd/lux/m$^2$) and color (recorded as CIE Color Coordinates) for each of Examples 5-9 were obtained according to the methods described above, the results for which are listed in Tables 6 and 7, respectively. Examples 5-9 were each tested for brightness in duplicates, and averages were calculated for each example. In addition, each of Examples 5-9 was tested for color in duplicates ("Sample 1" and "Sample 2"), and an average for each example was obtained for each CIE color coordinate.

TABLE 6

BRIGHTNESS RESULTS FOR EXAMPLES 5-9, RECORDED AS COEFFICIENT OF RETROREFLECTION ($R_A$; cd/lux/m$^2$)

| BRIGHTNESS | | Ex. 5 Dark Blue | Ex. 6 Blue | Ex. 7 Bright Blue | Ex. 8 Ocean Blue | Ex. 9 Cyan |
|---|---|---|---|---|---|---|
| Non-colored | Sample 1 | 895 | 921 | 1070 | 1000 | 871 |
| | Sample 2 | 1040 | 809 | 1070 | 943 | 854 |
| | Average | 967.5 | 865.0 | 1070.0 | 971.5 | 862.5 |
| Blue | Sample 1 | 20.8 | 40.4 | 85 | 116 | 242 |
| | Sample 2 | 27.5 | 38.9 | 86 | 110 | 272 |
| | Average | 24.2 | 39.7 | 85.5 | 113.0 | 257.0 |

TABLE 7

COLOR RESULTS FOR EXAMPLES 5-9, RECORDED AS CIE COLOR COORDINATES

| COLOR | | Ex. 5 Dark Blue | Ex. 6 Blue | Ex. 7 Bright Blue | Ex. 8 Ocean Blue | Ex. 9 Cyan |
|---|---|---|---|---|---|---|
| Blue, Sample 1 | color Y | 1.9400 | 2.0600 | 2.8700 | 4.3500 | 9.2600 |
| | color x | 0.1935 | 0.1832 | 0.1621 | 0.1484 | 0.1609 |
| | color y | 0.1663 | 0.1105 | 0.1106 | 0.1272 | 0.1860 |
| Blue, Sample 2 | color Y | 1.9600 | 2.2800 | 2.8100 | 4.3800 | 9.9900 |
| | color x | 0.1958 | 0.1864 | 0.1623 | 0.1485 | 0.1621 |
| | color y | 0.1697 | 0.1181 | 0.1092 | 0.1281 | 0.1923 |
| Blue, Average | color Y | 1.9500 | 2.1700 | 2.8400 | 4.3650 | 9.6250 |
| | color x | 0.1947 | 0.1848 | 0.1622 | 0.1485 | 0.1615 |
| | color y | 0.1680 | 0.1143 | 0.1099 | 0.1277 | 0.1892 |

Examples 10-16

Launderability Testing of Retroreflective Articles Comprising Overlays Colored and Imaged with Toner Powders, Thermal Mass Transfer Inks, Or Sublimation Dyes For each of Examples 10-16, the overlay and prismatic retroreflective article were prepared according to the preparation process described above in Examples 1-4. The same graphic used in Examples 1-9 was used in Examples 10-16, but the graphic application/preparation step (i.e., step 11 of the overlay and retroreflective article preparation process) differed. The graphic preparation step for each example is detailed below.

For Examples 10 and 11, the graphic, overlay, and prismatic retroreflective article was formed according to the processes described above for Examples 1 and 2, respectively. For Examples 12, 13 and 14, the graphic, overlay and prismatic retroreflective article was formed according to the processes described above for Examples 7, 8 and 9, respectively.

For Example 15, the following static charge printing process was used to obtain the graphic on the underside/rear surface of the bonding layer of the transfer article from step 11 of the overlay preparation process described above in Examples 1-4:

The graphic was printed on the underside/rear surface of the bonding layer using Xeikon V2 transparent cyan toner powder (polyester based toner powder, available from Xeikon, Mortsel, Belgium) on a Xeikon DCP-1 digital electrophotographic non-contact fuser (available from Xeikon, Mortsel, Belgium) at 100° C.

For Example 16, the following sublimation process was used to obtain the graphic on the underside/rear surface of the bonding layer of the transfer article from step 11 of the overlay preparation process described above in Examples 1-4:

1. The desired graphic was printed on imaging paper (available under the trade designation "3M™ 8616" from 3M Company, St. Paul, Minn.) using a 3M™ SCOTCHPRINT™ 2000 electrostatic printer (previously available from 3M Company) and 3M™ SCOTCHPRINT™ Dye Sublimation Series 8760/8860 transparent cyan dye sublimation toner (previously available from 3M Company; other sublimation dyes that are designed for use with 3M™ SCOTCHPRINT™ printers are currently available from Hilord Chemical Corporation, Hauppauge, N.Y., including the Hilord SP-2000 Dye Sublimation Electrostatic Digital Inks for 3M's SCOTCHPRINT™ 2000 printer) to form a graphic donor sheet. The printer voltage settings were adjusted to give a graphic on the imaging paper with approximately the following densities: black, 1.35; yellow, 0.67; cyan, 1.35; magenta, 1.35; as measured with a color reflection densitometer (available under the trade designation "X-RITE 404" from X-rite, Inc., Grand Rapids, Mich.).
2. A heat press (available under the trade designation "HIX PRESS N-800" from Hix Corporation, Pittsburgh, Kans.) was preheated to 350° F. (177° C.), with air pressure set to 20 psi (1.4×10$^5$ Pa) and timer set to 30 sec.
3. The overlay from step 11 of the overlay and retroreflective article preparation process described in Examples 1-4 was sandwiched between silicone paper release liners (available from Mondi Packaging Akrosil LLC, Menasha, Wis.) with the graphic donor sheet to form a composite, where the sublimation dye side of the graphic donor sheet was in contact with the underside/rear surface of the bonding layer of the overlay.
4. The composite from step 3 was then pressed in the heat press described in step 2 at 350° F. (177° C.) and 20 psi (1.4×10$^5$ Pa) for 30 sec. The press was then opened, and the pressed composite was removed from the heat press.
5. The composite was allowed to cool for 2 min. Then, the graphic donor sheet bearing the sublimation dye was removed from the overlay to form an overlay bearing an infused graphic.

Each of Examples 10-16 was tested for brightness before and after 50 wash cycles (i.e., after 50 wash cycles of 5:1 wash:dry, according to the above-described wash durability test method), the results for which are shown in Table 8, recorded as Coefficient of Retroreflection ($R_A$; cd/lux/m$^2$) and percent brightness retention ("% Retained"). Examples were tested for brightness in single or duplicate samples, each sample was tested in two different positions (i.e., "a" and "b") on the strip, and averages were calculated for each example.

In addition, each example was tested for color before and after 50 wash cycles, the results for which are shown in Table 9, recorded as CIE Color Coordinates and Color Shifts. Examples were tested for color in duplicates ("Sample 1" and "Sample 2"). An average for each example was obtained for each CIE color coordinate (i.e., x, y, and Y), and the x,y color shift (x,y shift=SQRT((Blue, Avg$_{x,After}$–Blue, Avg$_{x,Before}$)$^2$+ (Blue, Avg$_{y, After}$–Blue, Avg$_{y,Before}$)$^2$) and Y,x,y color shift (Y,x,y shift=SQRT((Blue, Avg$_{x,After}$–Blue, Avg$_{x,Before}$)$^2$+ (Blue, Avg$_{y,After}$–Blue, Avg$_{y,Before}$)$^2$+(Blue, Avg$_{y,After}$–Blue, Avg$_{y,Before}$)$^2$) where calculated for each example.

Each of Examples 10-16 was also visually observed for overall appearance and ply separation (recorded as percent visualized separation) after 15 wash cycles (i.e., 15 wash cycles and 3 dry cycles) and after 50 wash cycles, the results for which are shown in Table 10.

TABLE 8

BRIGHTNESS RESULTS BEFORE AND AFTER 50 WASH CYCLES FOR EXAMPLES 10-16, RECORDED AS COEFFICIENT OF RETROREFLECTION ($R_A$; cd/lux/m$^2$) AND % RETAINED

| BRIGHTNESS | | Ex. 10 | Ex. 11 | Ex. 12 | Ex. 13 | Ex. 14 | Ex. 15 | Ex. 16 |
|---|---|---|---|---|---|---|---|---|
| Before wash Non-colored | Sample 1a | 628 | 558 | 1100 | 1170 | 952 | 690 | 538 |
| | Sample 1b | 602 | 535 | 980 | 1190 | 846 | 636 | 507 |
| | Sample 2a | | | 1020 | 1190 | 960 | 708 | |
| | Sample 2b | | | 1030 | 1170 | 898 | 680 | |
| | Average | 615.0 | 546.5 | 1032.5 | 1180.0 | 914.0 | 678.5 | 522.5 |
| Before wash Blue | Sample 1a | 55.8 | 121 | 80.9 | 157 | 307 | 184 | 68.9 |
| | Sample 1b | 44.8 | 115 | 73.1 | 140 | 274 | 175 | 74.5 |
| | Sample 2a | | | 79.7 | 155 | 326 | 202 | |
| | Sample 2b | | | 86.4 | 159 | 294 | 187 | |
| | Average | 50.3 | 118.0 | 80.0 | 152.8 | 300.3 | 187.0 | 71.7 |
| After wash Non-colored | Sample 1a | 422 | 424 | 580 | 571 | 496 | 471 | 312 |
| | Sample 1b | 403 | 405 | 549 | 548 | 511 | 437 | 297 |
| | Sample 2a | | | 567 | 548 | 571 | 541 | |
| | Sample 2b | | | 639 | 547 | 549 | 572 | |
| | Average | 412.5 | 414.5 | 583.75 | 553.5 | 531.8 | 505.3 | 304.5 |
| | % Retained | 67.1% | 75.8% | 56.5% | 46.9% | 58.2% | 74.5% | 58.3% |
| After wash Blue | Sample 1a | 32.5 | 114 | 73.4 | 24.5 | 162 | 40.7 | 80.7 |
| | Sample 1b | 32.7 | 115 | 69.9 | 70.4 | 168 | 159 | 159 |
| | Sample 2a | | | 78 | 70.5 | 184 | 73.4 | |
| | Sample 2b | | | 28.5 | 68 | 167 | 134 | |
| | Average | 32.6 | 114.5 | 62.45 | 58.4 | 170.3 | 101.8 | 119.85 |
| | % Retained | 64.8% | 97.0% | 78.0% | 38.2% | 56.7% | 54.4% | 167.2% |

TABLE 9

COLOR RESULTS BEFORE AND AFTER 50 WASH CYCLES FOR
EXAMPLES 10-16, RECORDED AS CIE COLOR COORDINATES
AND COLOR SHIFTS

| COLOR | | Ex. 10 | Ex. 11 | Ex. 12 | Ex. 13 | Ex. 14 | Ex. 15 | Ex. 16 |
|---|---|---|---|---|---|---|---|---|
| Before wash, Blue, Sample 1 | color Y | 3.4800 | 3.9900 | 3.7400 | 4.3500 | 6.6500 | 6.0300 | 4.2100 |
| | color x | 0.2265 | 0.2197 | 0.2213 | 0.2017 | 0.1958 | 0.1907 | 0.2201 |
| | color y | 0.2092 | 0.2112 | 0.1971 | 0.1936 | 0.2166 | 0.2219 | 0.2128 |
| Before wash, Blue, Sample 2 | color Y | 3.6300 | 4.0200 | 3.7800 | 4.3100 | 6.5600 | 5.9000 | 4.2700 |
| | color x | 0.2224 | 0.2206 | 0.2205 | 0.2024 | 0.1966 | 0.1893 | 0.2168 |
| | color y | 0.2090 | 0.2127 | 0.1969 | 0.1931 | 0.2161 | 0.2180 | 0.2090 |
| Before wash, Blue, Avg | color Y | 3.5550 | 4.0050 | 3.7600 | 4.3300 | 6.6050 | 5.9650 | 4.2400 |
| | color x | 0.2245 | 0.2202 | 0.2209 | 0.2021 | 0.1962 | 0.1900 | 0.2185 |
| | color y | 0.2091 | 0.2120 | 0.1970 | 0.1934 | 0.2164 | 0.2200 | 0.2109 |
| After wash, Blue, Sample 1 | color Y | 3.73 | 4.49 | 4.64 | 4.44 | 6.76 | 7.39 | 6.23 |
| | color x | 0.217 | 0.2158 | 0.1983 | 0.2038 | 0.1969 | 0.196 | 0.2139 |
| | color y | 0.2043 | 0.2132 | 0.1933 | 0.1952 | 0.2151 | 0.2192 | 0.2243 |
| After wash, Blue, Sample 2 | color Y | 3.76 | 4.51 | 4.86 | 4.75 | 6.89 | 6.8 | 9.59 |
| | color x | 0.2163 | 0.2157 | 0.2016 | 0.2006 | 0.1958 | 0.1958 | 0.2411 |
| | color y | 0.2028 | 0.2129 | 0.1981 | 0.197 | 0.2154 | 0.2159 | 0.2734 |
| After wash, Blue, Avg | color Y | 3.7450 | 4.5000 | 4.7500 | 4.5950 | 6.8250 | 7.0950 | 7.9100 |
| | color x | 0.2167 | 0.2158 | 0.2000 | 0.2022 | 0.1964 | 0.1959 | 0.2275 |
| | color y | 0.2036 | 0.2131 | 0.1957 | 0.1961 | 0.2153 | 0.2176 | 0.2489 |
| Color Change | x, y shift | 0.0096 | 0.0045 | 0.0210 | 0.0028 | 0.0011 | 0.0064 | 0.0390 |
| Color Change | Y, x, y shift | 0.1902 | 0.4950 | 0.9902 | 0.2650 | 0.2200 | 1.1300 | 3.6702 |

TABLE 10

VISUAL OBSERVATIONS OF EXAMPLES 10-16 AFTER 15 WASH
CYCLES AND AFTER 50 WASH CYCLES, RECORDED AS
PERCENT SEPARATION OBSERVED IN THE RETROREFLECTIVE ARTICLES

| OBSERVATIONS | Ex. 10 | Ex. 11 | Ex. 12 | Ex. 13 | Ex. 14 | Ex. 15 | Ex. 16 |
|---|---|---|---|---|---|---|---|
| 15 WASH CYCLES | 0% | 0% | 0% | 0% | 0% | 0% | 0% |
| 50 WASH CYCLES | 10% | 5% | 20% | 15% | 5% | 60%* | 60% |

*Example 16 also showed some color bleed after 50 wash cycles.

Examples 17-19

Launderability Testing of Retroreflective Articles
Comprising Overlays colored and Imaged with Toner
Powders, Thermal Mass Transfer Inks, or
Sublimination Dyes For each of Examples 17-19, a graphic was applied to the underside/rear surface of a bonding layer of an overlay, and the overlay was then applied to a body portion to form a retroreflective article including the overlay bearing a graphic. Each of Examples 17-19 was then subjected to the wash durability test method described above. The same graphic that was used in Examples 1-16 was also used in Examples 17-19. For Example 17, the graphic, overlay, and prismatic retroreflective article was formed according to the processes described above for Example 15, such that the graphic was applied via a static charge printing process. For Example 18, the graphic, overlay, and prismatic retroreflective article was formed according to the processes described above for Example 16, such that the graphic was applied via a sublimation process. For Example 19, the graphic, overlay, and prismatic retroreflective article was formed according to the processes described above for Example 1, such that the graphic was applied via a thermal mass transfer process.

Figure 7:
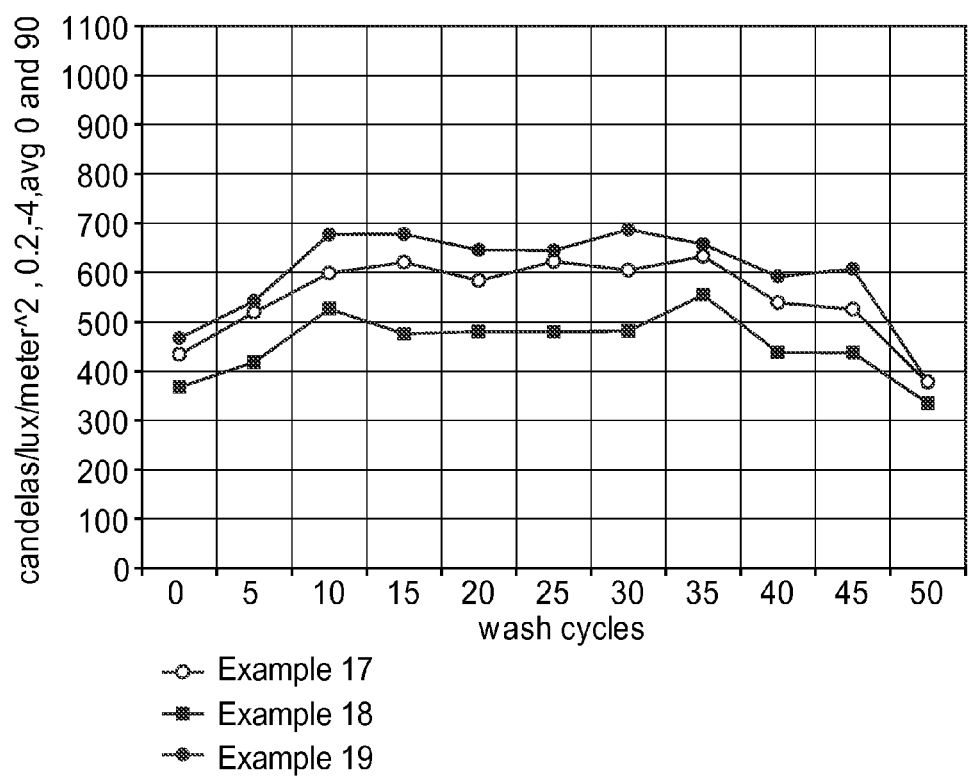
FIG. 7 is a graph illustrating retroreflectivity brightness retention of Examples 17-19, after various numbers of wash cycles.

Each of Examples 17-19 was tested for brightness before and after every 5 wash cycles, up to and including 50 wash cycles, according to the wash durability test method described above, the results for which are shown in FIG. 7, recorded as Coefficient of Retroreflection ($R_A$; cd/lux/m$^2$). Examples were tested in duplicates and the data in FIG. 7 represents the average brightness for each example. Each example was also visually observed for overall appearance and ply separation after 5 wash cycles and after 50 wash cycles, the results for which are shown in Table 11. The percent brightness retention ("% Retained") was calculated for each of Examples 17-19 after 5 wash cycles and after 50 wash cycles, and is reported in Table 12.

TABLE 11

VISUAL OBSERVATIONS OF EXAMPLES 17-19 AFTER
5 WASH CYCLES AND AFTER 50 WASH CYCLES

| OBSERVATIONS | Ex. 17 | Ex. 18 | Ex. 19 |
|---|---|---|---|
| 5 WASH CYCLES | No separation | No separation | No separation |
| 50 WASH CYCLES | Some separation under colored portion of overlay | Some separation under the non-colored portion of overlay | No separation |

TABLE 12

PERCENT BRIGHTNESS RETENTION OF EXAMPLES 17-19
AFTER 5 WASH CYCLES AND AFTER 50 WASH CYCLES

| OBSERVATIONS | Ex. 17 | Ex. 18 | Ex. 19 |
|---|---|---|---|
| 5 WASH CYCLES | 120% | 114% | 116% |
| 50 WASH CYCLES | 87% | 91% | 81% |

The embodiments described above and illustrated in the figures are presented by way of example only and are not intended as a limitation upon the concepts and principles of the present disclosure. As such, it will be appreciated by one having ordinary skill in the art that various changes in the elements and their configuration and arrangement are possible without departing from the spirit and scope of the present disclosure. Various features and aspects of the present disclosure are set forth in the following claims.

What is claimed is:

1. A retroreflective article comprising:
an optical layer comprising retroreflective optical elements, the optical layer having a front surface and a rear surface; and
an overlay having a front surface and a rear surface, the rear surface adapted to be coupled to the front surface of the optical layer, the overlay including a graphic, such that the graphic is buried with respect to the front surface of the overlay,
wherein the rear surface of the overlay is at least partially formed of a bonding material that has a bonding temperature greater than room temperature, and
wherein at least one of:
the rear surface is further at least partially formed of a graphic material forming the graphic that has a bonding temperature greater than room temperature; and
the bonding material is infused with the graphic.

2. The retroreflective article of claim 1, wherein the retroreflective optical elements include cube-corner optical elements, and wherein the rear surface of the optical layer is formed at least partially by the cube-corner optical elements.

3. The retroreflective article of claim 1, wherein the retroreflective optical elements include microsphere optical elements.

4. The retroreflective article of claim 1, further comprising a transparent polymeric body portion having a front surface and a rear surface, the transparent polymeric body portion being positioned between the optical layer and the overlay.

5. The retroreflective article of claim 1, wherein the overlay comprises a barrier layer and a bonding layer, and wherein the barrier layer forms at least a portion of the front surface of the overlay, and the bonding layer comprises the bonding material that forms at least a portion of the rear surface of the overlay.

6. The retroreflective article of claim 5, wherein at least one of the barrier layer and the bonding layer comprises at least one of a thermoset material, a thermoresistive material, and a combination thereof.

7. The retroreflective article of claim 5, wherein the barrier layer comprises at least one of a polyurethane, a polyurethane acrylate, a polyacrylate, and a combination thereof.

8. The retroreflective article of claim 1 wherein the bonding material comprises a thermoplastic polyurethane.

9. The retroreflective article of claim 1, wherein the bonding material is at least partially formed of a thermoplastic ink.

10. The retroreflective article of claim 1, wherein the bonding material includes a colorant.

11. The retroreflective article of claim 1, wherein the graphic material is radiation curable.

12. The retroreflective article of claim 1, the graphic material is thermally crosslinkable.

13. The retroreflective article of claim 1, wherein the graphic includes an image.

14. The retroreflective article of claim 1, wherein the graphic is formed of at least one of a thermoplastic ink, a thermal mass transfer ink, a toner powder, a sublimation colorant, and a combination thereof.

15. The retroreflective article of claim 1, wherein the graphic includes a sublimation dye.

16. A method of making a retroreflective article, the method comprising:
providing an optical layer comprising retroreflective optical elements, the optical layer having a front surface and a rear surface;
providing an overlay having a front surface and a rear surface, the rear surface of the overlay being at least partially formed of a bonding material that has a bonding temperature greater than room temperature;
applying a graphic to the rear surface of the overlay, such that the graphic is buried with respect to the front surface of the overlay; and
coupling the overlay bearing the graphic to the front surface of the optical layer,
wherein applying a graphic to the rear surface of the overlay includes at least one of:
applying a graphic material to the rear surface of the overlay to form the graphic, the graphic material having a bonding temperature greater than room temperature; and
infusing the bonding material with the graphic.

17. The method of claim 16, wherein applying a graphic to the rear surface of the overlay includes at least one of printing, hot stamping, thermal mass transfer, static charge printing, sublimation, and combinations thereof.

18. The method of claim 16, wherein applying a graphic to the rear surface of the overlay includes applying an image to the rear surface of the overlay.

19. A transfer article comprising:
an overlay having a front surface and a rear surface, the rear surface of the overlay adapted to be coupled to a substrate,
the overlay including a graphic, such that the graphic is buried with respect to the front surface of the overlay,
wherein the rear surface of the overlay is at least partially formed of a bonding material that has a bonding temperature greater than room temperature, and wherein at least one of:
the rear surface is further at least partially formed of a graphic material forming the graphic that has a bonding temperature greater than room temperature; and
the bonding material is infused with the graphic.

20. The transfer article of claim 19, wherein the substrate includes at least a portion of a retroreflective article, such that the overlay forms a portion of the retroreflective article when coupled to the substrate.

* * * * *

UNITED STATES PATENT AND TRADEMARK OFFICE
CERTIFICATE OF CORRECTION

PATENT NO.       : 8,506,095 B2
APPLICATION NO.  : 13/130844
DATED            : August 13, 2013
INVENTOR(S)      : Chet A. Bacon It is certified that error appears in the above-identified patent and that said Letters Patent is hereby corrected as shown below:

In the Specification

Column 7
Line 60, Delete "coploymers," and insert -- copolymers, --, therefor.

Column 8
Line 6, Delete "cube corner" and insert -- cube-corner --, therefor.
Line 9, Delete "cube corner" and insert -- cube-corner --, therefor.
Line 56, Delete "$10^8$," and insert -- $13 \times 10^8$, --, therefor.

Column 9
Line 26, Delete "cube corner" and insert -- cube-corner --, therefor.

Column 10
Line 62, Delete "a and" and insert -- and --, therefor.

Column 13
Line 16, Delete "stampling," and insert -- stamping, --, therefor.

Column 16
Line 4, Delete "a and" and insert -- and --, therefor.

Column 19
Line 30, Delete "(Hawthrone," and insert -- (Hawthorne, --, therefor.
Line 32, Delete "(Hawthrone," and insert -- (Hawthorne, --, therefor.

Column 21
Line 29, After "remaining" delete "the".

Signed and Sealed this
Seventeenth Day of December, 2013

Margaret A. Focarino
*Commissioner for Patents of the United States Patent and Trademark Office*

CERTIFICATE OF CORRECTION (continued)
U.S. Pat. No. 8,506,095 B2

Column 21
Line 43, Delete "2 min" and insert -- 2 min. --, therefor.
Line 49, Delete "2 min," and insert -- 2 min., --, therefor.

Column 24
Line 52, Delete "Sublimination" and insert -- Sublimation --, therefor.

Column 26
Line 32, Delete "$\mathrm{Avg}_{y,\,After}$" and insert -- $\mathrm{Avg}_{y,After}$ --, therefor.
Line 34, Delete "$\mathrm{Avg}_{y,After}$" and insert -- $\mathrm{Avg}_{Y,After}$ --, therefor.
Line 35, Delete "$\mathrm{Avg}_{y,Before}$" and insert -- $\mathrm{Avg}_{Y,Before}$ --, therefor.

Column 27
Line 54, Delete "Sublimination" and insert -- Sublimation --, therefor.

In the Claims

Column 30
Line 16, In Claim 12, After "1," insert -- wherein --.